(12) United States Patent
Yoshida

(10) Patent No.: US 8,849,033 B2
(45) Date of Patent: Sep. 30, 2014

(54) IMAGE-READING DEVICE

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/873,177

(22) Filed: Aug. 31, 2010

(65) Prior Publication Data

US 2010/0322520 A1   Dec. 23, 2010

Related U.S. Application Data

(62) Division of application No. 11/708,464, filed on Feb. 21, 2007.

(30) Foreign Application Priority Data

Feb. 21, 2006  (JP) ................................. 2006-044431
Feb. 21, 2006  (JP) ................................. 2006-044440

(51) Int. Cl.
| | | |
|---|---|---|
| G06K 9/00 | (2006.01) | |
| H04N 1/40 | (2006.01) | |
| H04N 1/00 | (2006.01) | |
| H04N 1/32 | (2006.01) | |

(52) U.S. Cl.
CPC ....... *H04N 1/40062* (2013.01); *H04N 1/00795* (2013.01); *H04N 1/32609* (2013.01); *H04N 1/00968* (2013.01); *H04N 1/3263* (2013.01); *H04N 2201/0434* (2013.01); *H04N 1/32646* (2013.01); *H04N 2201/3288* (2013.01); *H04N 1/00801* (2013.01)
USPC .......................................... 382/181; 358/470

(58) Field of Classification Search
None
See application file for complete search history.

(56) References Cited

U.S. PATENT DOCUMENTS

| | | | |
|---|---|---|---|
| 5,384,785 A * | 1/1995 | Yoda ............................ | 714/746 |
| 5,532,839 A * | 7/1996 | Beikirch et al. .............. | 358/401 |
| 6,052,207 A | 4/2000 | Takagi et al. | |
| 6,880,122 B1 | 4/2005 | Lee et al. | |
| 2002/0186424 A1 * | 12/2002 | Sturgeon et al. ............. | 358/474 |
| 2004/0004733 A1 | 1/2004 | Barker et al. | |
| 2004/0042658 A1 | 3/2004 | Simske et al. | |
| 2007/0035780 A1 * | 2/2007 | Kanno ......................... | 358/403 |

FOREIGN PATENT DOCUMENTS

| | | | |
|---|---|---|---|
| JP | 6259596 | * | 9/1994 |
| JP | 06259596 A | * | 9/1994 |
| JP | H06-259596 A | | 9/1994 |

(Continued)

OTHER PUBLICATIONS

Japan Patent Office, Office Action for Japanese Patent Application No. 2006-044431 (counter to co-pending U.S. Appl. No. 11/708,464), mailed Sep. 6, 2010.
Japan Patent Office, Office Action for Japanese Patent Application No. 2006-044440 (counterpart to co-pending U.S. Appl. No. 11/708,464), mailed Sep. 6, 2010.
Japan Patent Office, Decision of Rejection for Japanese Patent Application No. 2006-044440 (counterpart to above-captioned patent application), mailed Feb. 24, 2011.

(Continued)

*Primary Examiner* — Kim Vu
*Assistant Examiner* — Fred Hu
(74) *Attorney, Agent, or Firm* — Baker Botts L.L.P.

(57) ABSTRACT

An image-reading device includes a reading unit, a displaying unit, a recognition target region setting unit, a recognition target region adding unit, and a character recognizing unit. The recognition target region setting unit sets a recognition target region within the displayed image data to recognize characters. The recognition target region adding unit adds a new recognition target region based on the recognition target region set by the recognition target region setting unit. The character recognizing unit performs character recognition in the recognition target regions.

17 Claims, 29 Drawing Sheets

(56) References Cited

FOREIGN PATENT DOCUMENTS

| JP | 7200613 | * | 8/1995 |
| JP | 7200613 A | * | 8/1995 |
| JP | H07-200613 A | | 8/1995 |
| JP | 08125838 A | * | 5/1996 |
| JP | H08-241401 A | | 9/1996 |
| JP | H09-147050 A | | 6/1997 |
| JP | 2002-269495 A | | 9/2002 |

OTHER PUBLICATIONS

Japan Patent Office, Office Action for Japanese Patent Application No. 2006-044431 (counterpart to above-captioned patent application), mailed Nov. 25, 2010.

Japan Patent Office, Office Action for Japanese Patent Application No. 2006-044440 (counterpart to above-captioned patent application), mailed Nov. 25, 2010.

* cited by examiner

FIG.15

| PAGE NUMBER | CONTENT OF STORED DATA |
|---|---|
| 1 | SCANNED PAGE 1 |
| 2 | SCANNED PAGE 2 |
| ⋮ | ⋮ |

FIG.16(a)

| PAGE NUMBER | NUMBER OF SCANNED PAGE |
|---|---|
| 0 | 0 |
| 0 | 0 |
| 0 | 0 |
| 0 | 0 |
| 0 | 0 |

FIG.16(b)

| PAGE NUMBER | NUMBER OF SCANNED PAGE |
|---|---|
| 1 | 1 |
| 4 | 1 |
| 0 | 0 |
| 0 | 0 |
| 0 | 0 |

FIG.16(c)

| PAGE NUMBER | NUMBER OF SCANNED PAGE |
|---|---|
| 1 | 1 |
| 2 | 1 |
| 4 | 1 |
| 0 | 0 |
| 0 | 0 |

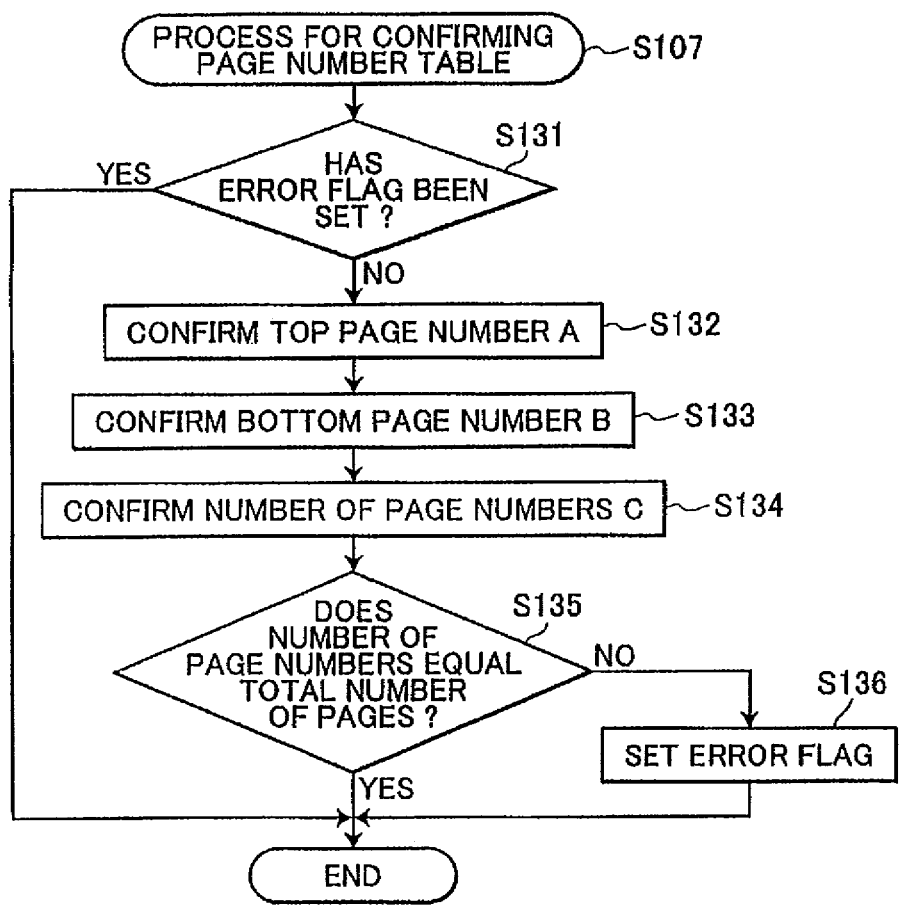

FIG.21(a)

| PAGE NUMBER | NUMBER OF SCANNED PAGE | FLAG INDICATING THE EXISTENCE OF A PAGE NUMBER |
|---|---|---|
| 1 | 1 | 1 |
| 2 | 1 | 1 |
| 3 | 1 | 1 |
| 0 | 0 | 0 |
| 0 | 0 | 0 |

FIG.21(b)

| PAGE NUMBER | NUMBER OF SCANNED PAGE | FLAG INDICATING THE EXISTENCE OF A PAGE NUMBER |
|---|---|---|
| 1 | 1 | 1 |
| 2 | 1 | 1 |
| 3 | 1 | 1 |
| 4 | 1 | 0 |
| 0 | 0 | 0 |

FIG.22(a)

| PAGE NUMBER | NUMBER OF SCANNED PAGE | FLAG INDICATING THE EXISTENCE OF A PAGE NUMBER |
|---|---|---|
| 1 | 1 | 0 |
| 2 | 1 | 0 |
| 0 | 0 | 0 |
| 0 | 0 | 0 |
| 0 | 0 | 0 |

FIG.22(b)

| PAGE NUMBER | NUMBER OF SCANNED PAGE | FLAG INDICATING THE EXISTENCE OF A PAGE NUMBER |
|---|---|---|
| 0 | 1 | 0 |
| 1 | 1 | 0 |
| 2 | 1 | 1 |
| 0 | 0 | 0 |
| 0 | 0 | 0 |

| NUMBER | PAGE TYPE | COORDINATE | WIDTH | LENGTH |
|--------|-----------|------------|-------|--------|
| 1 | ONE PORTRAIT | (X1, Y1) | M1 | N1 |
| 2 | ONE LANDSCAPE | (X2, Y2) | M2 | N2 |
| ⋮ | ⋮ | ⋮ | ⋮ | ⋮ |

IMAGE-READING DEVICE

CROSS REFERENCE TO RELATED APPLICATIONS

This application is a divisional application of U.S. patent application Ser. No. 11/708,464, filed Feb. 21, 2007, which claims the benefit of Japanese Patent Application No. 2006-044431 filed Feb. 21, 2006, and Japanese Patent Application No. 2006-044440 filed Feb. 21, 2006, the disclosures of which are incorporated herein by reference in their entirety.

TECHNICAL FIELD

The present invention relates to an image-reading method, a program, and an image-reading device.

BACKGROUND

Various improvements have been made in image-reading devices, such as copiers or scanners, for reading the target matter more accurately and efficiently. For example, character recognition techniques have been used in some conventional image-reading devices to recognize the page number of the book being read and to use this page number in the reading process.

SUMMARY

However, multi-feed errors are unavoidable in image-reading devices equipped with a page turning mechanism. A multi-feed error occurs when the page turning mechanism turns two or more pages at once. Japanese unexamined patent application publication No. HEI-6-259596 proposes an image-reading device for resolving this error. This image-reading device has a page turning mechanism for turning the pages of a bound book, and a scanning unit for reading image data from each page. The image-reading device reads and recognizes the page number from data read by the scanning unit and determines that a multi-feed has occurred when the page numbers are not continuous. If this occurs, the page turning mechanism returns to the correct page, and the scanning unit scans the image data from the skipped page, thereby ensuring that digital data is obtained for the entire book without skipping pages.

Further, Japanese unexamined patent application publication No. 2002-269495 proposes a character recognition device for accurately and efficiently reading only a recognition target region in images read by scanner from a plurality of sheets of an original document. By introducing a function for specifying attributes (reading conditions), such as a non-reading target region, the character recognition device can avoid performing the same adjustments over a plurality of pages, thereby simplifying the reading operation and improving reading accuracy.

However, with the image-reading device disclosed in Japanese unexamined patent application publication No. HEI-6-259596, the region corresponding to the location of the page number must be set for each reading operation since the location varies according to the original document. When reading a plurality of pages at one time, such as the two-page spread of an open book, regions corresponding to only the page numbers must be specified. Further, this image-reading device cannot handle cases in which the target of reading is not arranged in the proper page order, nor cases in which a plurality of pages of the original document having the same page number are read.

The character recognition device disclosed in Japanese unexamined patent application publication No. 2002-269495 is also problematic in that the user cannot individually set regions for character recognition. Further, the specification does not describe the conditions for performing character recognition in detail. Further, the device is not configured for detecting multi-feeds.

In view of the foregoing, it is an object of the present invention to provide an image-recording method, a program, and an image-reading device capable of setting regions for performing character recognition, while reducing the burden on the user for setting regions for page recognition.

It is another object of the present invention to provide an image-reading method, a program, and an image-reading device capable of detecting page reading errors, such as multi-feed errors, while reducing the load on the user for setting regions for page recognition.

In order to attain the above and other objects, the invention provides an image-reading device. The image-forming device includes a reading unit, a displaying unit, a displaying unit, and a character recognizing unit. The reading unit reads an original document as image data. The displaying unit displays the image data read by the reading unit. The displaying unit sets a recognition target region within the displayed image data to recognize characters. The recognition target region adding unit adds a new recognition target region based on the recognition target region set by the recognition target region setting unit. The character recognizing unit performs character recognition in the recognition target regions.

According to another aspects, the invention provides an image-reading device. The image-reading device includes a reading unit, a displaying unit, a recognition target region setting unit, and a character recognizing unit. The reading unit reads an original document as image data. The displaying unit displays the image data read by the reading unit. The recognition target region setting unit sets a recognition target region within the displayed image data to recognize characters. The character recognizing unit performs character recognition in the recognition target region. The character recognizing unit includes a page recognizing unit recognizing a page number provided in the recognition target region. The reading error determining unit determines whether or not a page reading error has occurred based on recognition results by the page recognizing unit.

According to still another aspects, the invention provides an image-reading method. The image-reading method includes reading an original document as image data, displaying the image data read by the reading step, setting a recognition target region within the displayed image data to recognize characters, adding a new recognition target region based on the recognition target region set in the recognition target region setting step, and performing character recognition in the recognition target regions.

According to still another aspects, the invention provides an image-reading method. The image-reading method includes reading an original document as image data, displaying the image data read by the reading step, setting a recognition target region within the displayed image data to recognize characters, and performing character recognition in the recognition target region. The performing character recognition includes recognizing a page number provided in the recognition target region. The image-reading method includes determining whether or not a page reading error has occurred based on recognition results of the page number recognizing.

According to still another aspects, the invention provides a computer program recorded on a computer readable recording medium, executable by a computer. The computer program includes instructions for reading an original document as image data, instructions for displaying the image data read by the reading step, instructions for setting a recognition target region within the displayed image data to recognize characters, instructions for adding a new recognition target region based on the recognition target region set in the instructions for setting, and instructions for performing character recognition in the recognition target regions.

According to still another aspects, the invention provides a computer program recorded on a computer readable recording medium, executable by a computer. The computer program recorded on a computer readable recording medium, executable by a computer includes instructions for reading an original document as image data, instructions for displaying the image data read by the reading step, instructions for setting a recognition target region within the displayed image data to recognize characters, instructions for performing character recognition in the recognition target region. The instructions for performing character recognition includes instructions for recognizing a page number provided in the recognition target region. The computer program includes instructions for determining whether or not a page reading error has occurred based on recognition results of the instructions for recognizing the page number.

BRIEF DESCRIPTION OF THE DRAWINGS

Illustrative aspects in accordance with the invention will be described in detail with reference to the following figures wherein:

FIG. 15 is a table showing the storage format of scanned data;

FIGS. 16(a)-16(c) are explanatory diagrams showing an example of a page number table;

FIG. 17 is a flowchart illustrating steps in a process for confirming the page number table;

FIG. 18 is an explanatory diagram showing an example of the page number table used in the process of FIG. 17;

FIGS. 21(a) and 21(b) are explanatory diagrams showing an example of a page number table used in the process of FIG. 20;

FIGS. 22(a) and 22(b) are explanatory diagrams showing another example of a page number table used in the process of FIG. 20;

DETAILED DESCRIPTION

Figure 1:
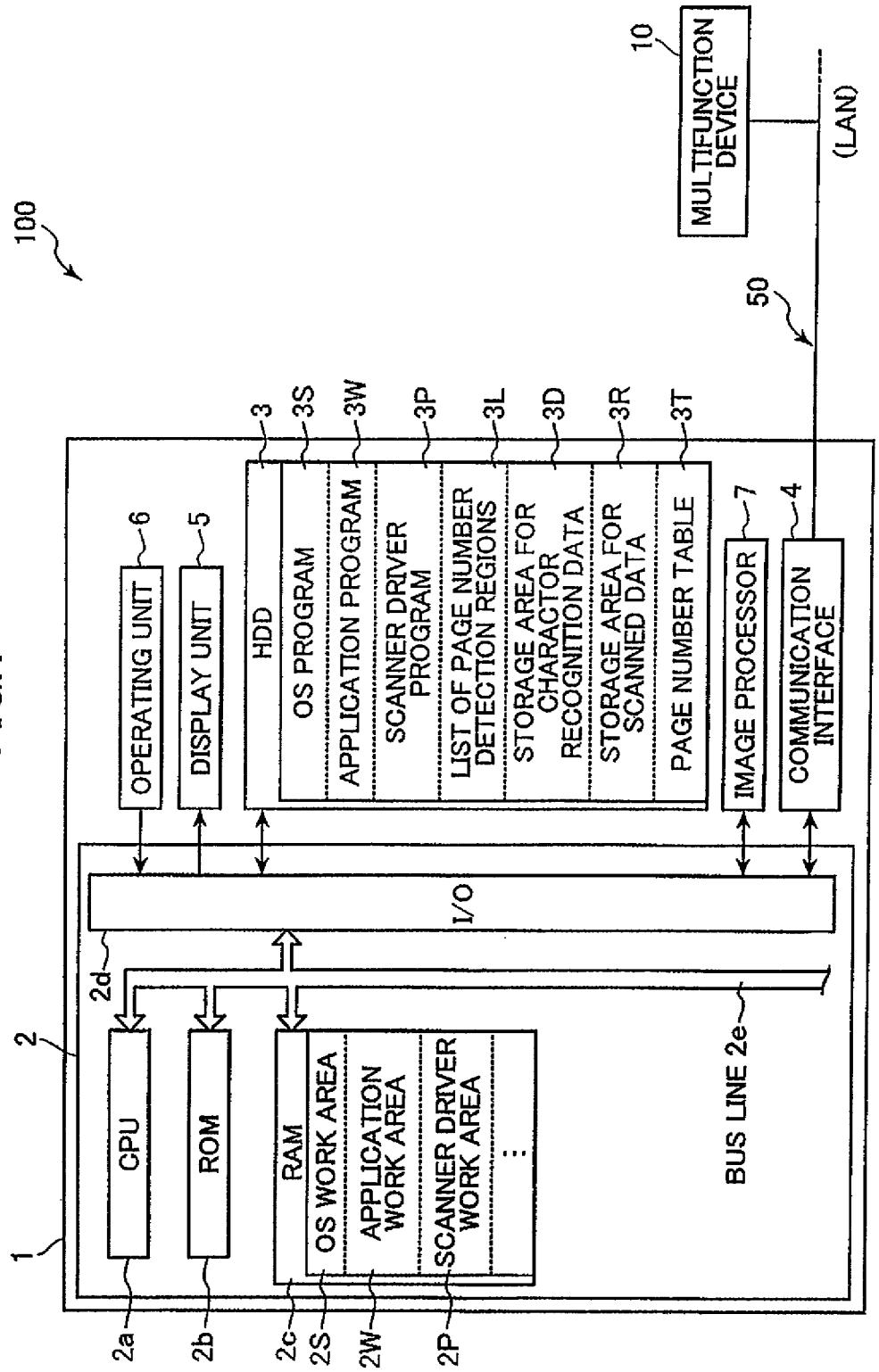
FIG. 1 is a block diagram showing an image-reading device and a personal computer.

A preferred embodiment of the image-reading method and image-reading device according to the present invention will be described while referring to the accompanying drawings. In the preferred embodiment, the image-reading device will be a scanner system 100. FIG. 1 is a block diagram showing the structure of the scanner system 100. As shown in FIG. 1, the scanner system 100 includes a personal computer 1 connected to a multifunction device 10 having an image-reading function. When the personal computer 1 transmits a scan command to the multifunction device 10, the multifunction device 10 performs a scanning process using the image-reading function.

As shown in FIG. 1, the personal computer 1 has a structure well known in the art including a hard disk drive 3, a communication interface 4, a display unit 5, an operating unit 6, and an image processor 7 that are all connected to a control circuit 2.

The hard disk drive 3 stores an OS program 3S functioning as the operating system (OS) that drives the personal computer 1, an application program 3W that operates in the OS environment, a scanner driver program 3P that also operates in the OS environment, a list of page number detection regions 3L, a storage area for character recognition data 3D, a storage area for scanned data 3R, and a page number table 3T, which will be described later in greater detail.

The communication interface 4 includes a network adaptor having a function for interfacing with a communication network 50, such as a local area network (LAN), to enable communications with the multifunction device 10 or another device connected to the communication network 50.

The display unit 5 is configured of a liquid crystal display, or CRT display. The operating unit 6 includes a pointing device, such as a mouse, and a keyboard.

The control circuit 2 is configured of a common computer and includes a CPU 2a, a ROM 2b, a RAM 2c, and an input/output interface 2d that are all connected to a bus line 2e. The CPU 2a performs control processes based on the OS program 3S stored in the hard disk drive 3. The OS program 3S runs in a section of the RAM 2c functioning as an OS work area 2S. The application program 3W and scanner driver program 3P similarly run in sections of the RAM 2c functioning as an application work area 2W and a scanner driver work area 2P.

The image processor 7 is configured with an image processing circuit for analyzing images acquired over the communication network 50 according to a pattern recognition technique well known in the art. As will be described later, the images acquired over the communication network 50 are images read by a scanning unit 24 (see FIG. 2) of the multifunction device 10.

The multifunction device 10 is connected to the communication network 50 so as to be capable of exchanging data with the personal computer 1 and performs image scanning and other processes based on commands received from the personal computer 1. In order for the multifunction device 10 to operate as an image-reading device in this way, a scanner driver program 3P supporting the multifunction device 10 must be installed on the personal computer 1. While the multifunction device 10 is indirectly connected to the personal computer 1 via the communication network 50 in the preferred embodiment, the multifunction device 10 may also be directly connected to the personal computer 1 through a parallel port or USB port (not shown).

Figure 2:
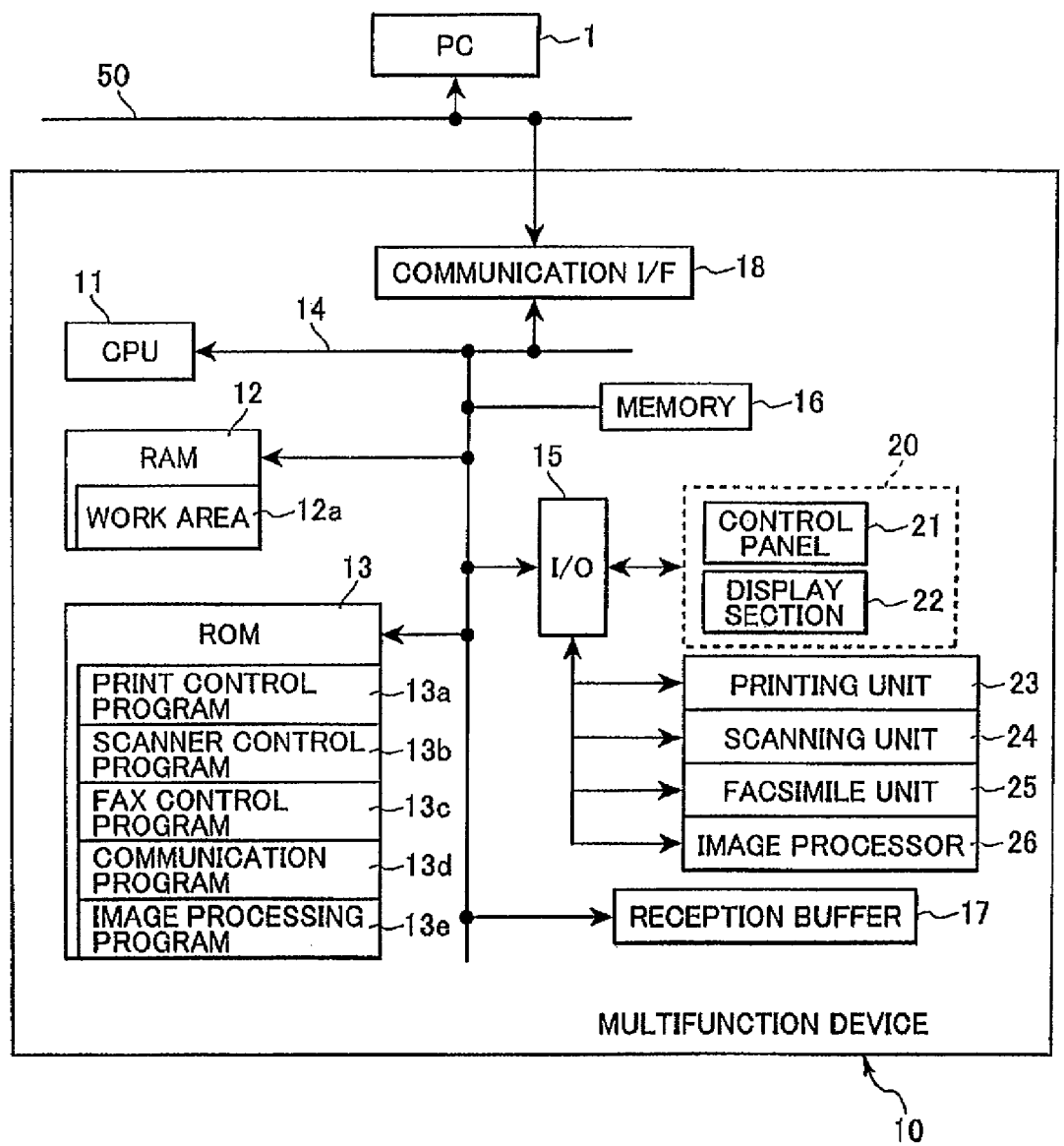
FIG. 2 is a block diagram showing a multifunction device.

FIG. 2 is a block diagram of the multifunction device 10. However, the structure of the present invention is not limited to that of the multifunction device 10 in the preferred embodiment, but may be any scanning device having an image-reading function.

As shown in FIG. 2, the multifunction device 10 includes a CPU 11, a RAM 12 having a work area 12a, a ROM 13 for storing various programs, a bus line 14, an input/output unit 15 (denoted by I/O in FIG. 2), a memory unit 16, a communication interface 18 (denoted by communication I/F in FIG. 2), and a reception buffer 17 for temporarily storing received data, such as print control data.

The ROM 13 stores a print control program 13a, a scanner control program 13b, a FAX control program 13c, a communication program 13d, and an image processing program 13e.

The input/output unit 15 is connected to various targets of control, including a control panel 20 (shown in greater detail in FIG. 3); a printing unit 23 configured of an inkjet printing mechanism, a laser printing mechanism, a thermal transfer printing mechanism, or a dot impact printing mechanism well known in the art; the scanning unit 24 provided with an image sensor for scanning original documents; a facsimile unit 25 including a FAX modem for performing facsimile communications; and an image processor 26 for performing various processes on image data read by the scanning unit 24. The operations of the printing unit 23, scanning unit 24, facsimile unit 25, and image processor 26 are well known in the art. The CPU 11 controls these operations by executing the corresponding print control program 13a, scanner control program 13b, FAX control program 13c, and image processing program 13e stored in the ROM 13 using the work area 12a of the RAM 12.

The communication interface 18 includes a communication interface circuit for exchanging data with the personal computer 1 via the communication network 50. The CPU 11 executes the communication program 13d stored in the ROM 13 for exchanging various data through an external network connected to the communication network 50.

The memory unit 16 is a nonvolatile memory, such as EEPROM (electrically erasable and programmable read-only memory). The memory unit 16 may also store a telephone book, for example, for storing telephone numbers and other contact information together with the names of people or companies. Using this telephone book, the user can transmit faxes to desired telephone numbers. The memory unit 16 may also be configured of a hard disk drive.

Figure 3:
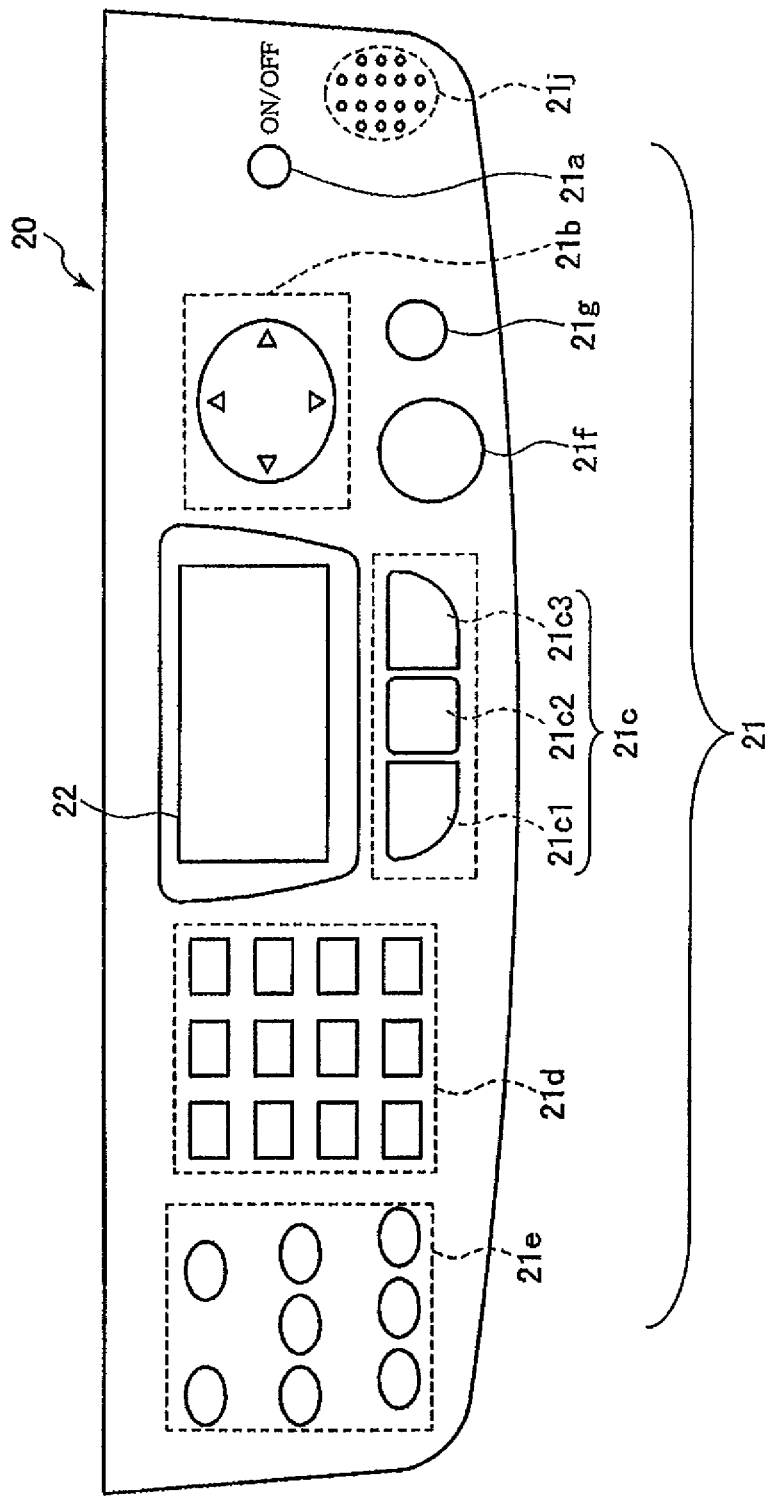
FIG. 3 is an explanatory diagram illustrating a control panel on the multifunction device.

FIG. 3 shows an example of the control panel 20 provided on the multifunction device 10. The control panel 20 includes an operating section 21, and a display section 22. The operating section 21 of the preferred embodiment employs mechanical keys, including a power button 21a for switching the power to the multifunction device 10 on and off; cursor keys 21b; function selecting buttons 21c, including a copy button 21c1, a FAX button 21c2, and a scan button 21c3; a ten-key pad 21d; one-touch buttons 21e for registering telephone numbers, facsimile numbers, and other data; a start button 21f for initiating various operations; and a stop button 21g for canceling or stopping various operations. The operating section 21 also includes a speaker 21j.

The display section 22 includes a dot matrix color liquid crystal display, and a drive circuit (not shown) for controlling the liquid crystal display. The drive circuit employs an active matrix drive system, for example, capable of reliably turning on and off desired pixels with transistors provided for each pixel. The drive circuit displays images based on commands and image data transferred from the input/output unit 15. The display section 22 may also be configured of an organic EL (electroluminescence) display or a plasma display.

The operating section 21 may also be configured as a touch panel formed integrally with the display section 22. The touch panel may be a resistive type or a capacitive type. The resistive touch panel provides an electric circuit in a gap called a spacer formed between a glass substrate and transparent film provided on the screen of the display section 22, the electric circuit having wiring that extends along the X-axis and Y-axis. When a user touches the film, wiring in the pressed region short-circuits to produce a change in voltage, enabling the touched location to be detected as two-dimensional coordinates (X, Y).

The user places the original to be scanned on the scan bed provided in the scanning unit 24.

Figure 4:
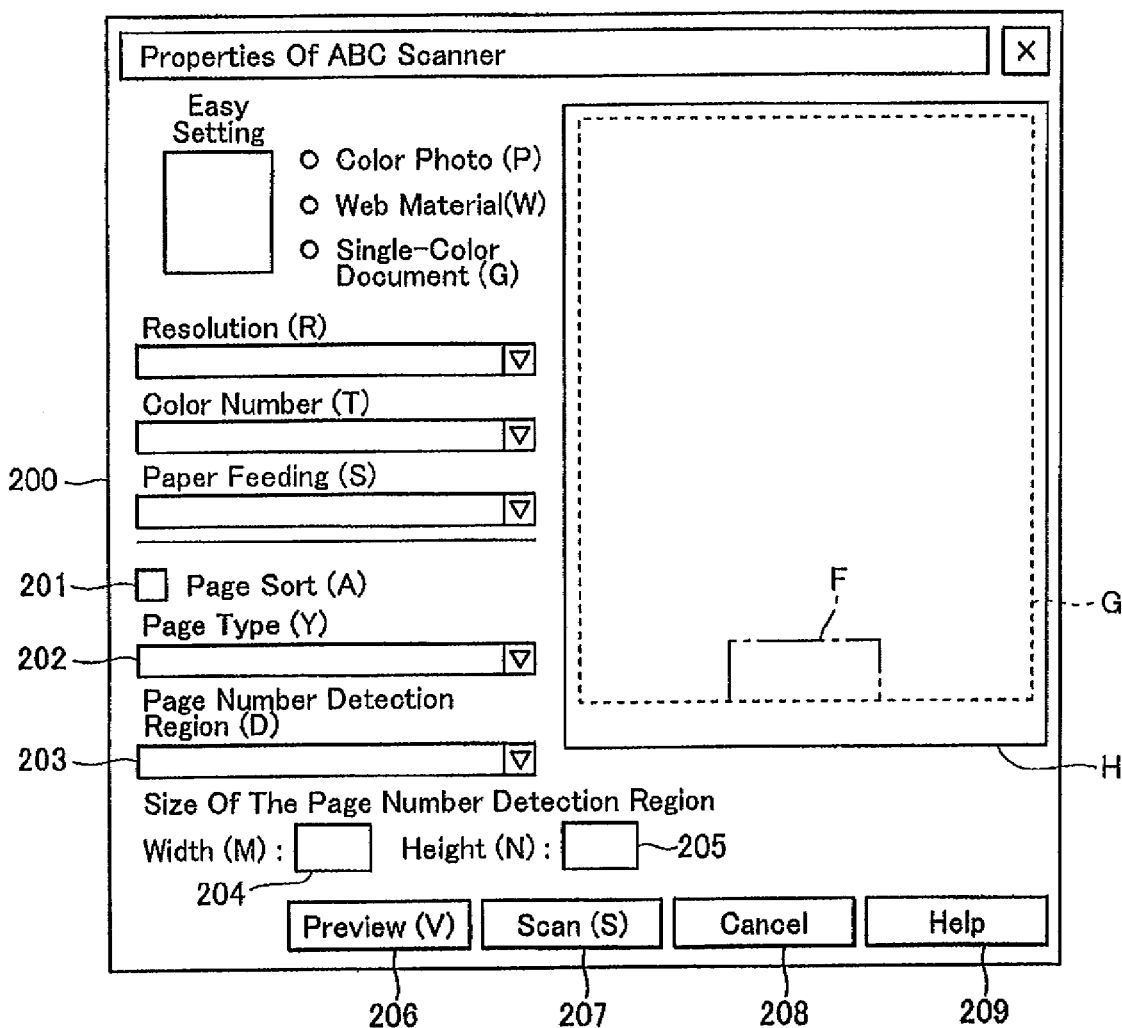
FIG. 4 is a screen shot of a dialog window for setting a scanning mode.

As shown in FIG. 4, when the personal computer 1 first starts the scanner driver program 3P, a dialog window 200 is displayed on the display unit 5 for setting a scanning mode and other functional settings for the scanner (the multifunction device 10 in the preferred embodiment).

As shown in FIG. 4, the scanning mode may be set according to an easy setting method in which the user specifies the type of document, such as a color photo or a single-color document. Based on the specified document type, the personal computer 1 automatically sets the prescribed resolution, and color. The user may also set individual parameters for resolution, and color, as desired. If the user wishes to have page numbers detected in the original documents, the user clicks on a check box 201 to the left of "Page Sort" in the dialog window to place a check in the box 201. When the user checks the box 201 to the left of "Page Sort", both the scanning region G and a number detection region F are displayed in the preview window H. Assuming that a Page Type field 202 in a dialog window 200 is set to "one portrait page," and the Page Number Detection Region field 203 is set to "bottom center" as the default settings, then a single page is displayed in portrait format in the preview window H, and the page number detection region is displayed in the bottom center of this page.

Figure 5:
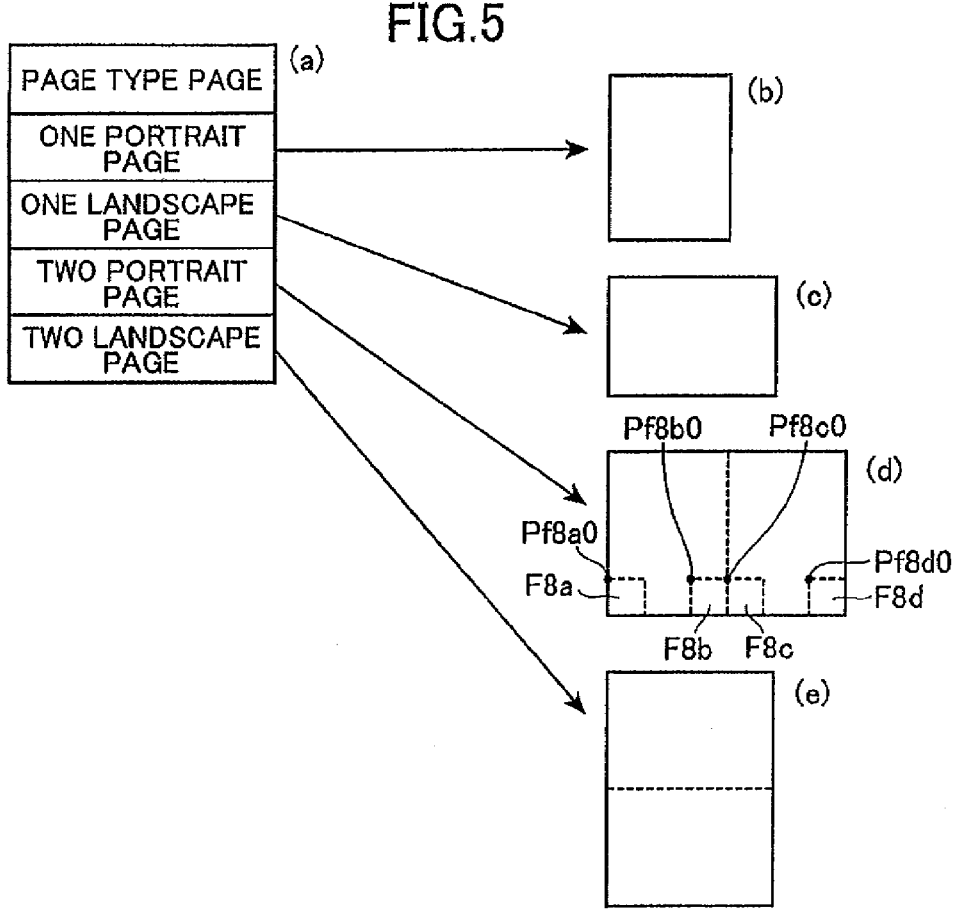
FIG. 5 is an explanatory diagram showing a "page type" pull-down menu.

If the user wishes to change the page type from the default settings, the user clicks on the triangle symbol on the right end of page type field 202 to display a pull-down menu, as shown in FIG. 5(*a*) and selects one of the page types in the menu from among "one portrait page" (a part (b) of FIG. 5), "one landscape page" (a part (c) of FIG. 5), "two portrait pages" (a part (d) of FIG. 5), and "two landscape pages" (a part (e) of FIG. 5).

Figure 6:
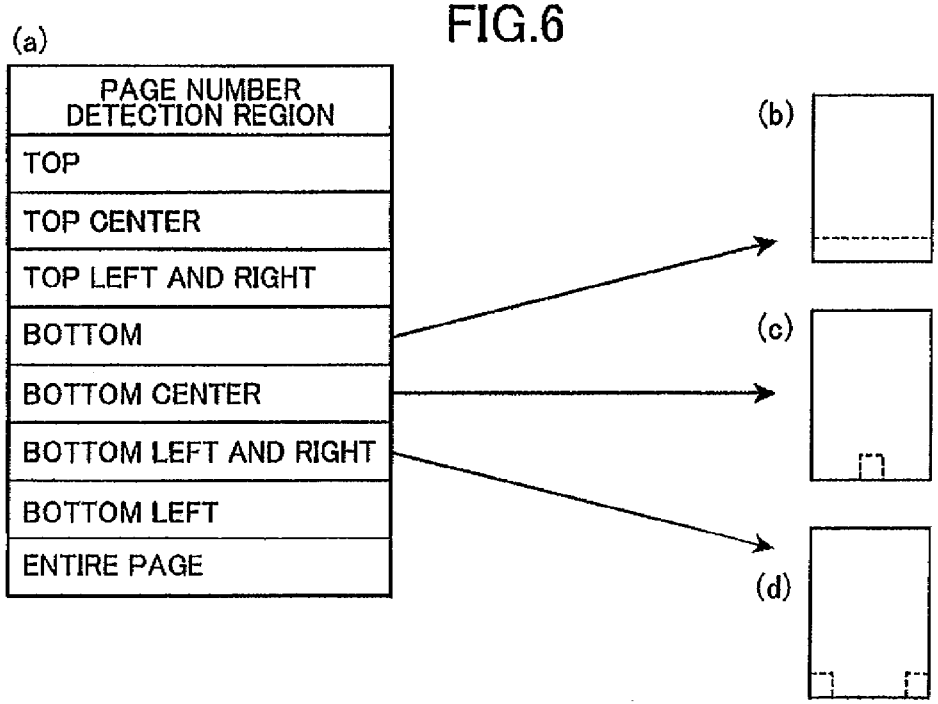
FIG. 6 is an explanatory diagram showing a "page number detection region" pull-down menu.

If the user wishes to modify the page number detection region from the default settings, the user clicks on the triangle symbol on the right end of the Page Number Detection Region field 203 to display a pull-down menu, such as that shown in a part (a) of FIG. 6, and selects one of the choices shown in the menu from "top" to "entire page." For example, "bottom" sets the region below the dotted line in a part (b) of FIG. 6 as the page number detection region, "bottom center" and "bottom left and right" sets the regions indicated by dotted lines in a parts (c) and (d) of FIG. 6, respectively, as the page number detection region.

If the user clicks the preview button 206 206, the first page of the original is preview scanned.

The page number detection region F selected above is displayed in the preview window H, enabling the user to confirm and modify the selection relative to the scanning region G. Although the scanning region G is generally equivalent to the size of the document being scanned, the user can modify the size of the scanning region G with the mouse.

Figure 9:
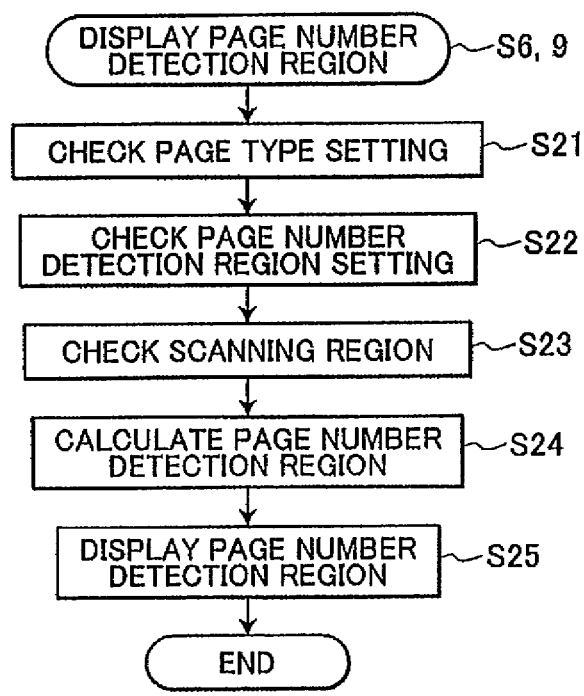
FIG. 9 is a flowchart illustrating steps in a process for displaying a page number detection region.

Regardless of the page types or sizes of scanned original documents, initial values for the page number detection region are pre-stored in the list of page number detection regions of the hard disk drive 3 as a width M and a height N. Initial values may be pre-stored in the list of page number detection regions 3L corresponding to page types and sizes of scanned original documents. However, if the page numbers or other characters, symbols, or patterns to be detected do not entirely fit within the page number detection region, the user can edit the page number detection region F by inputting desired values for the width M and height N in the respective boxes 204, 205 provided under "Size of the Page Number Detection Region" shown in the dialog window 200 of FIG. 9.

If the user clicks the scan button 207, the whole pages of the original are scanned based on the settings described above. The RAM 2*c* stores the user settings about the check box 201, the buttons, and the pull-down menus on the dialog window 200.

An image-reading process according to the present embodiment will be described next with reference to the flowchart in FIG. 7. First, in S1, the CPU 2*a* reads the settings the user sets on the dialog window 200 from the RAM 2*c*. If the CPU 2*a* detects that the Preview button 206 is clicked (S2: YES), then in S3 the CPU 2*a* issues a command to the multifunction device 10 to execute a preview scan, and the multifunction device 10 performs the preview scanning operation with the scanning unit 24. The results of the preview scan are transmitted to the CPU 2*a* and in S4 displayed in a preview window H along with a dotted line indicating the scanning region G as shown in FIG. 4.

When a check has been placed in the "Page Sort" check box 201 (S5: YES), then in S6 the CPU 2*a* edits and sets the page number detection region and displays the results in the preview window H. The process of S6 will be described below in greater detail. After displaying the page number detection region F, the CPU 2*a* returns to S1.

However, if the check has not been placed in the Page Sort check box 201 (S5: NO), then the CPU 2*a* skips S6 and returns to S1. If the CPU 2*a* does not detect that the Preview button 206 is clicked (S2: NO), then in S7 the CPU 2*a* determines whether a check has been placed in the "Page Sort" check box 201. If the check has been placed (S7: YES), then in S8 the CPU 2*a* determines whether the settings about "Page Type", "Page Number Detection Region", or "Size of the Page Number Detection Region" has been changed.

If the settings have been changed (S8: YES), in S9 the CPU 2*a* sets and calculates the page number detection region based on the settings read in S1 and displays the results in the preview window H, as shown in FIGS. 8(*a*)-8(*d*). FIGS. 8(*a*)-8(*d*) show examples of the different page types. If the user sets a page type of "one portrait page" and a page number detection region of "bottom left and right," then page number detection regions Fa1 and Fa2 will be displayed in the preview window H, as shown in FIG. 8(*a*). The page number detection regions displayed in the preview window H will change to Fb1-Fb4, shown in FIG. 8(*b*), when the user sets the page type to "two portrait pages"; Fc1 and Fc2, shown in FIG. 8(*c*), when the user sets the page type to "one landscape page"; and Fd1-Fd4, shown in FIG. 8(*d*), when the user sets the page type to "two landscape pages."

If the settings have not been changed (S8: NO), the CPU 2*a* proceeds to S10. In 510, the CPU 2*a* determines whether the Scan button 207 has been clicked. If the Scan button 207 has been clicked (S10: YES), then in S11, the CPU 2*a* determines whether the check has been placed in the "Page Sort" check box 201. If the check box 201 to the left of "Page Sort" has been checked (S11: YES), then in S12, the CPU 2*a* controls the image processor 7 to perform a scanning operation while performing a page number detection process in the page number detection region set and edited above. The multifunction device 10 transmits the image data read from the original during the scanning operation to the personal computer 1. Then the CPU 2*a* ends the process. If the check box 201 has not been checked (S11: NO), the CPU 2*a* controls the multifunction device 10 to perform a usual scanning operation that scans the original without detecting the page numbers. The multifunction device 10 transmits the image data read from the original during the scanning operation to the personal computer 1. The CPU 2*a* ends the process.

Figure 7:
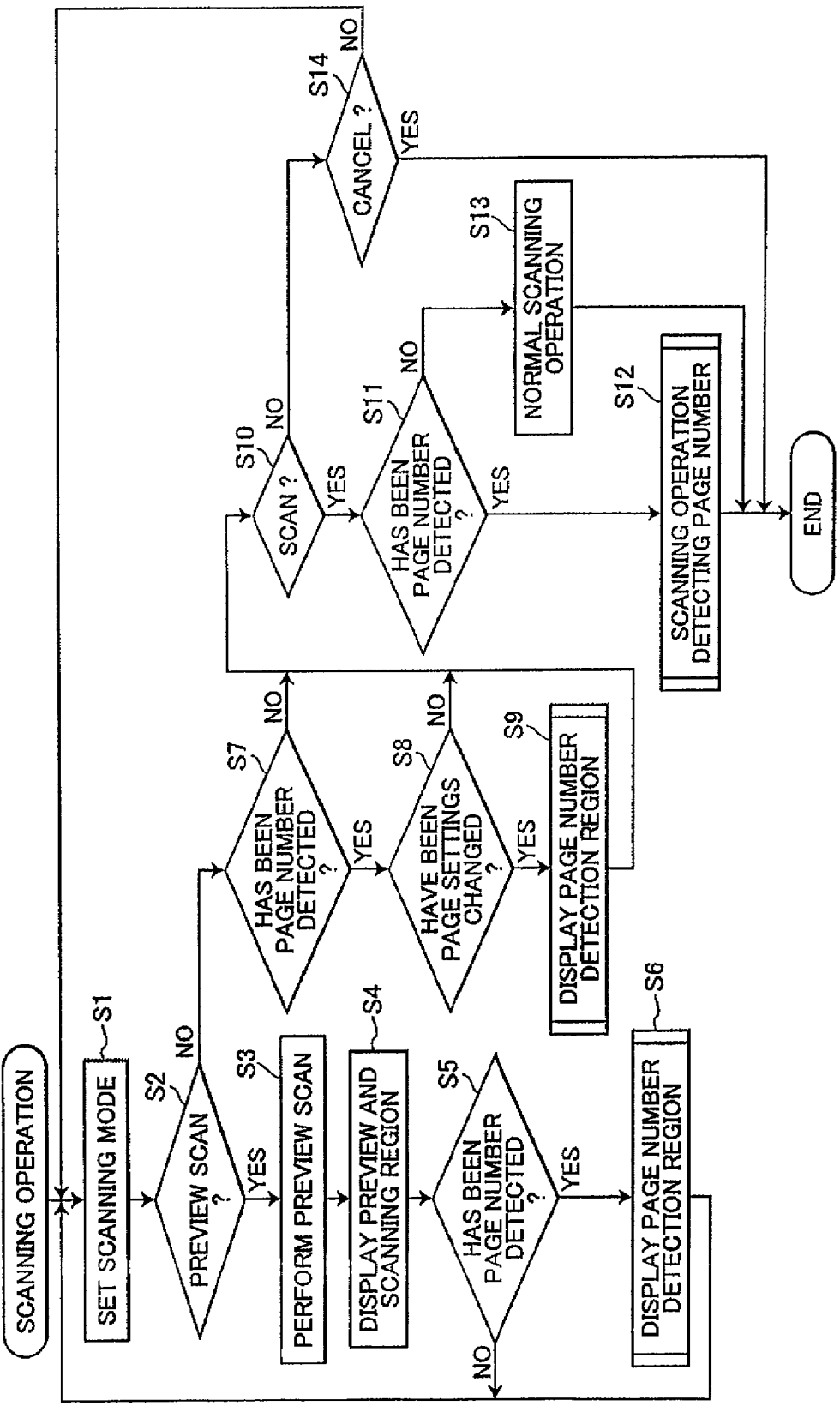
FIG. 7 is a flowchart illustrating steps in a image reading process.

Further, if the Scan button 207 has not been clicked in the dialog window 200 of FIG. 7 (S10: NO), the CPU 2*a* determines whether the Cancel button 208 has been clicked. If the Cancel button 208 has been clicked (S15: YES), then the CPU 2*a* closes the dialog window of FIG. 7 and ends the process. However, if the Cancel button 208 was not clicked (S15: NO), then the CPU 2*a* returns to S1.

Next, a process for displaying the page number detection region corresponding to S6 and S9 in FIG. 4 will be described with reference to FIGS. 9 through 12.

In S21 the CPU 2*a* checks the page type setting that has been read in S1. Then, in S22 the CPU 2*a* checks the setting about the page number detection region that has been read in S1 and in S23 the CPU 2*a* checks the setting about size of the scanning region G that has been read in S1. In S24 the CPU 2*a* calculates and edits the page number detection region F and in S25 displays this result in the preview window H.

Figure 10A:
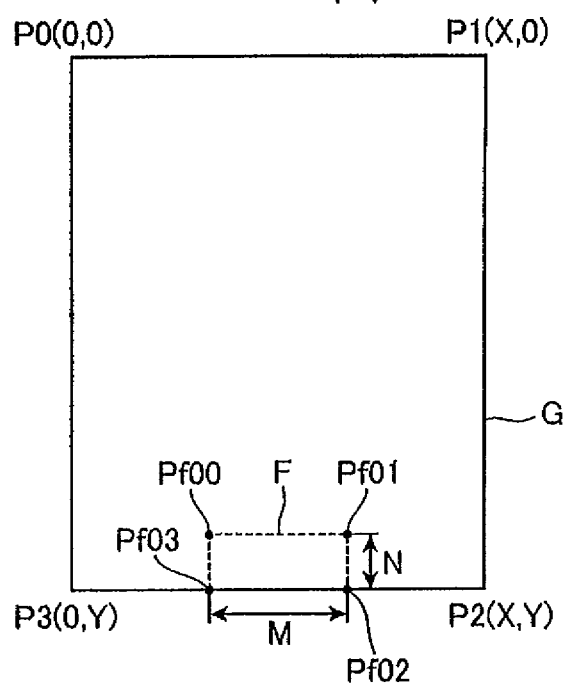
FIGS. 10(a) and 10(b) are explanatory diagrams illustrating an example for calculating the page number detection region.

Next, an example of a method for calculating the size of the page number detection region F in S24 will be described with reference to FIG. 10(a). In this example, the page type is set to "one portrait page," and the page number detection region F is displayed in the bottom center of the preview window H. Initially, the page number detection region F is displayed as a rectangular region having a width M and a height N. The scanning region G has a width X and a height Y, with the four corners P0, P1, P2, and P3 having the coordinates (0, 0), (X, 0), (X, Y), and (0, Y), respectively. In clockwise order beginning from the upper left corner, the page number detection region F has corners Pf00, Pf01, Pf02, and Pf03 having the coordinates ((X−M)/2, (Y−N)), ((X+M)/2, (Y−N)), ((X+M)/2, Y), and ((X−M)/2, Y), respectively.

Figure 8A:
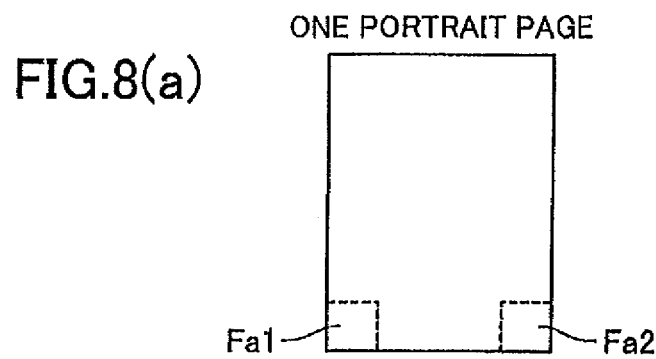
FIGS. 8(a)-8(d) are explanatory diagrams showing an example of the page number detection region.
Figure 8B:
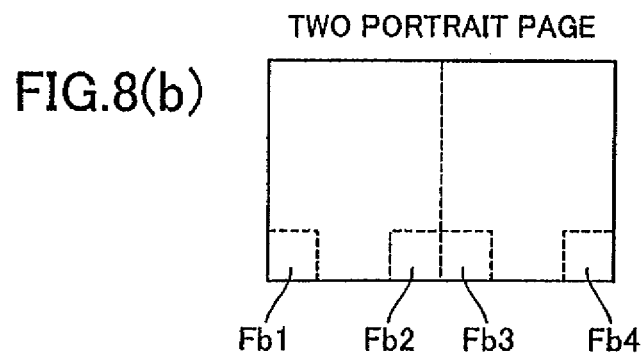
Figure 8C:
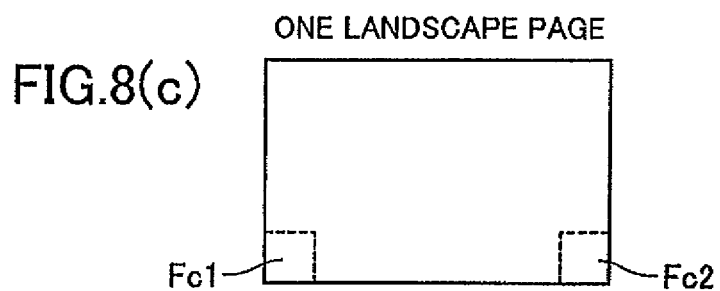
Figure 8D:
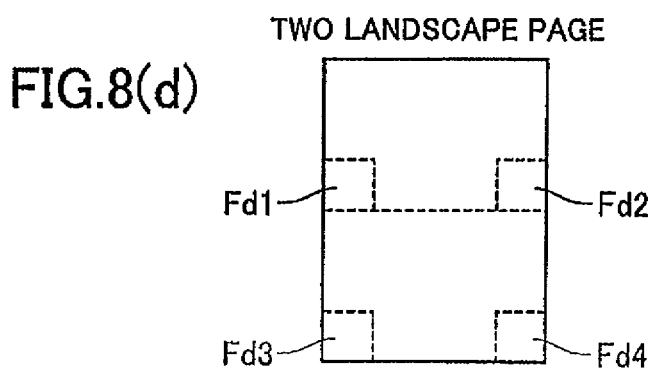

Similarly, when calculating the size of a page number detection region in the bottom left and right regions of preview window H data for the page type "one portrait page," as shown in FIG. 8(a), the coordinates for the upper left corner in the region on the bottom left are (0, (Y−N)), while the coordinates for the upper left corner in the region on the bottom right are ((X−M), (Y−N)).

Further, when calculating the size of page number detection regions F8a, F8b, F8c, and F8d in the bottom left and right of the preview image data for a page type of "two portrait pages," as shown in the part (d) of FIG. 5, the coordinates for upper left corners Pf8a0, Pf8b0, Pf8c0, and Pf8d0 for the four page number detection regions F8a, F8b, F8c, and F8d are (0, (Y−N)), ((X/2−M), (Y−N)), (X/2, Y−N)), and ((X−M), (Y−N)).

Figure 10B:
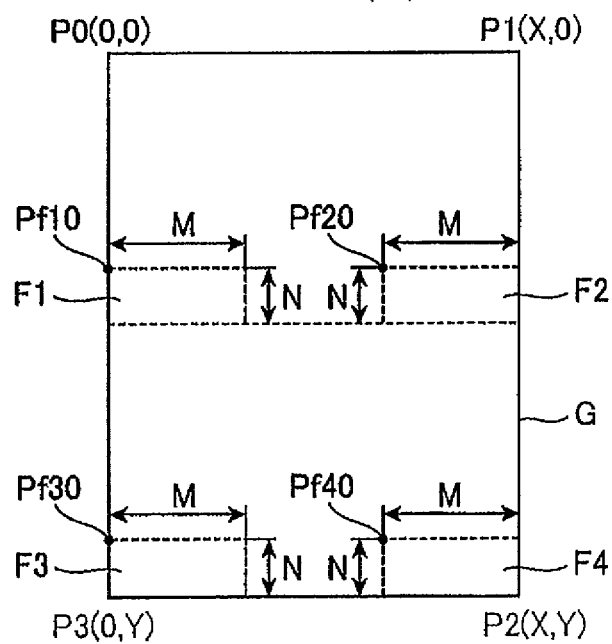

When calculating the size of page number detection regions F1, F2, F3, and F4 in the bottom left and right regions of preview image data for the page type "two landscape pages," as shown in FIG. 10(b), coordinates of upper left corners Pf10, Pf20, Pf30, and Pf40 for the four page number detection region F1, F2, F3, and F4 are (0, (Y/2−N)), ((X−M), (Y/2−N)), (0, (Y−N)), and ((X−M), (Y−N)). For all of the examples described above, the user can modify the size of the page number detection region (F, etc.) simply by specifying the lengths of the width M and height N.

Therefore, when the page number detection region is rectangular in shape, the personal computer 1 need only store the width M and height N of the page number detection region for each page type and the coordinates for the upper left corner of each page number detection region in the list of page number detection regions 3L. Since it is not necessary to store coordinates for the other three corners, the volume of data occupying the storage region in the hard disk drive 3 can be reduced. If the page number detection region is circular in shape, the CPU 2a can store coordinates for the center point of the circle and the length of the radius or, in the case of an ellipse, the lengths of the major axis and minor axis. For polygons, the CPU 2a can store the type of polygon, coordinates for the center point, and the distance from the center point to a vertex.

Figure 11:
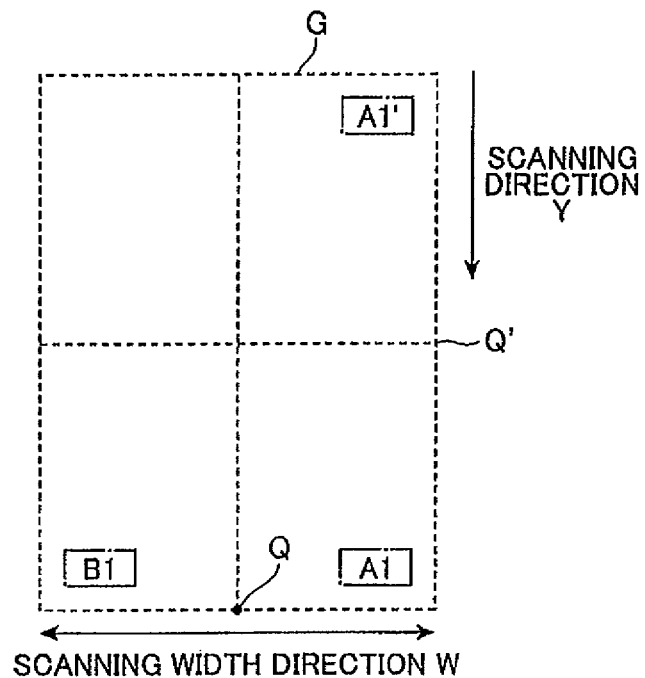
FIG. 11 is an explanatory diagram showing an example of adding the page number detection region.

As shown in FIG. 11, a page number detection region A1 is first set in the preview image data for the page type "one portrait page" when the user has selected "bottom right" under the "Page Number Detection Region" in the dialog window 200 of FIG. 4. Subsequently, in the process for calculating the page number detection region (S24), a page number detection region B1 is added at a position having left-right symmetry with the page number detection region A1 about a straight vertical line extending in the scanning direction Y and passing through a center point Q on an edge of the scanning region G running parallel to a scanning width W. Similarly, it is also possible to add a page number detection region A1' at a position having top-bottom symmetry with the page number detection region A1 about a straight transversal line extending in scanning width direction and passing through a center point Q'.

Figure 12:
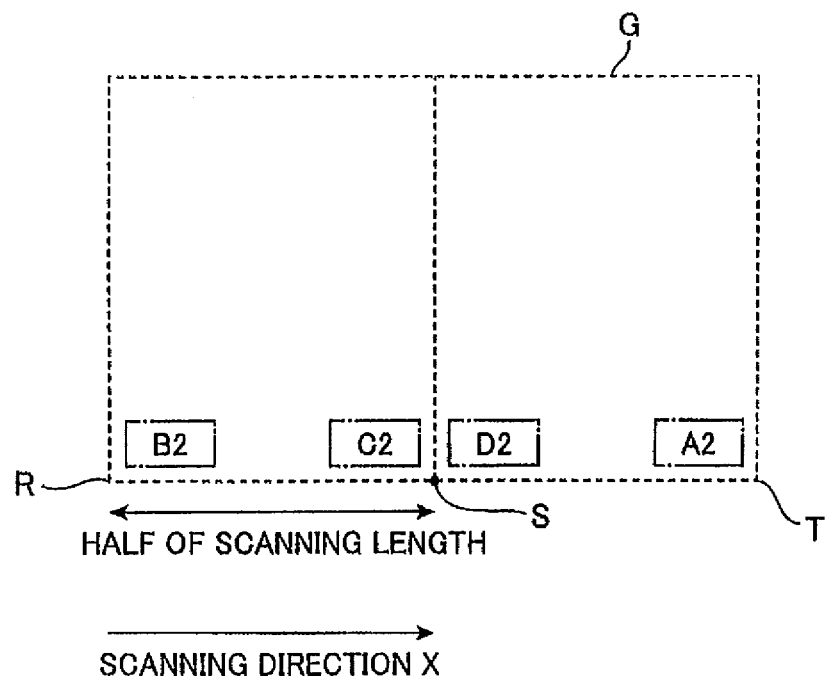
FIG. 12 is an explanatory diagram showing another example of adding the page number detection region.

Similarly, as shown in FIG. 12, a page number detection region A2 is first set in image data having a page type "two portrait page" when the user has selected "bottom right" in the "Page Number Detection Region" of the dialog window 200 in FIG. 4. Subsequently, in the process for calculating the page number detection region (S24), a page number detection region B2 is added to a position having left-right symmetry with the page number detection region A2 about a straight line orthogonal to a scanning direction X and passing through a center point S on an edge of the scanning region G parallel to the scanning direction X. In addition, a page number detection region C2 is added at a position having left-right symmetry with the page number detection region B2 about a straight line orthogonal to the scanning direction X that passes through a center point between a corner R and the center point S of the scanning region G, and a page number detection region D2 is added at a position having left-right symmetry to the page number detection region A2 about a straight line orthogonal to the scanning direction X that passes through a center point between the center point S and a corner T of the scanning region G.

Figure 13:
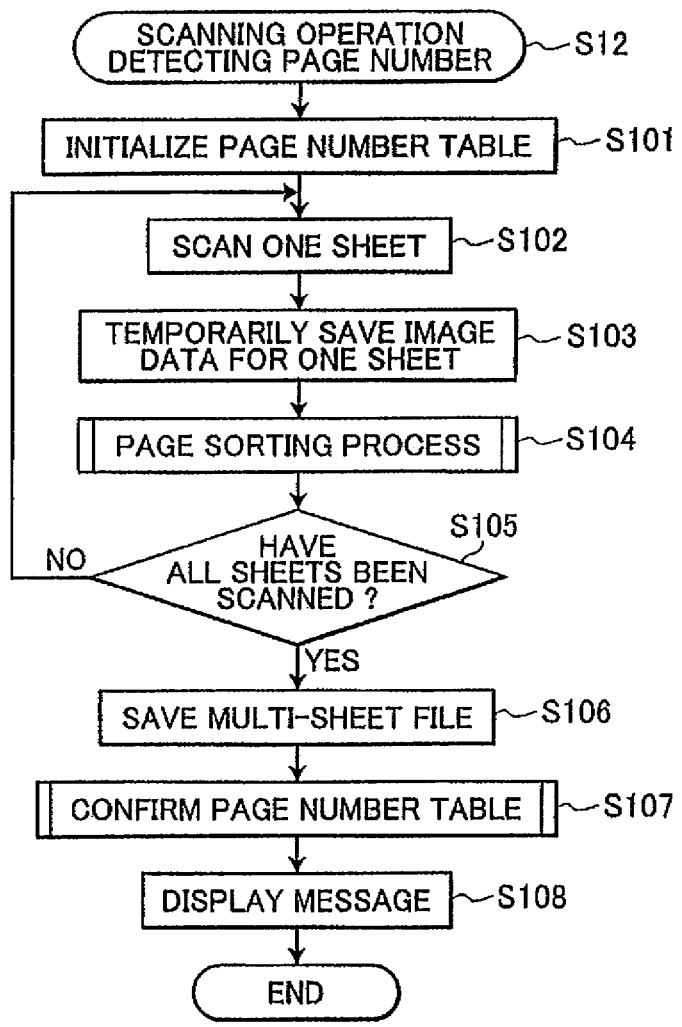
FIG. 13 is a flowchart illustrating steps in a scanning process.

Next, a scanning process including a process for detecting page numbers corresponding to S12 in FIG. 7 will be described with reference to FIG. 13.

In S101 the CPU 2a initializes the page number table 3T stored in the hard disk drive 3, which will be described later in greater detail, by clearing the table and setting all values to 0.

In S102 the CPU 2a transmits a command to the multifunction device 10 to scan one sheet. In S103, the CPU 2a temporarily stores image data for the scanned sheet in a prescribed region of the scanner driver work area 2P or the hard disk drive 3. In S104 the CPU 2a performs a page sorting process described later based on the page numbers detected when scanning the original document. The CPU 2a associates the detected number with the image data, and sorts the data according to page number. The processes in S102-S104 are repeated successively for all sheets of the original.

In S105, the CPU 2a determines whether all sheets of the original have been scanned. When all sheets of the original have been scanned (S105: YES), then in S106 the image data for all sheets is compiled in a single file in the order of the sorted page numbers (multi-page file) as shown in FIG. 15, and a page number table, described later, corresponding to this multi-page file in the scanner driver work area 2P is saved in the storage area for scanned data 3R of the hard disk drive 3. In the example shown in FIG. 15, the page number 1 is detected for a first scanned page, which is data read from the first page of the original document. Therefore, the first scanned page is stored in association with page number 1. In S107 the CPU 2a performs a process to confirm the page number table, which will be described later, and in S108 displays the results in the preview window H or in a window separate from the preview window H.

The results may be displayed according to the following method. (1) The CPU 2a may display an error message if an error was detected when sorting pages. For example, the CPU 2a may display the message "Could not read page no. 3." (2) The CPU 2a may display the scanning results if no error was detected when sorting pages. For example, the CPU 2a may display the message "Scanned page nos. 1-10."

Page numbers that were read correctly and page numbers that were not read correctly can be checked from the content stored in the page number table 3T.

Next, the process for sorting pages in S104 of FIG. 13 will be described with reference to the flowchart in FIG. 14 and the tables in FIGS. 16(a)-16(c). In S121 of the process in FIG. 14, the CPU 2a controls the image processor 7 to detect the page number from the page number detection region set according to the method described above.

In the page number detecting process of S121, the image processor 7 of the personal computer 1 performs a common binarization process on the image data transferred from the multifunction device 10 to convert the data to digital bilevel image data for each pixel. The image processor 7 uses a common image processing technique on the multilevel image data to determine whether the data includes a page number.

In addition to page numbers, the target of detection may be prescribed characters, symbols, or graphics in what is commonly called header data or footer data. The data that is targeted for detection is stored in the storage area for character recognition data 3D as character recognition data.

In S122 the CPU 2a reads the page number table 3T from the scanner driver work area 2P. The page number table 3T stores therein the page number detected through the scanning operation and the number of scanned pages from which the corresponding page number is detected. For example, FIG. 16(b) shows the case where page number "1" is detected from one scanned page, and page number "4" is detected from another scanned page. When the page number "1" is detected from two pages, for example, the page number table 3T will store therein the number of scanned page "2" in correspondence with the page number "1".

In S123 the CPU 2a compares the current page number to the page number stored in the page number table 3T to determine whether this page number is the largest. If the current page number is the largest (S123: YES), then in S124 the CPU 2a adds the current page number to the end of the page numbers already stored in the page number table 3T.

In the example of FIG. 16(a)-16(c), the page number table 3T includes page numbers and the number of scanned pages that include these page numbers. When the page number table 3T is initialized, all page numbers and number of pages are reset to 0, as shown in FIG. 16(a).

When the CPU 2a detects page number 1 in this initialized state, page number 1 is the largest number. Therefore, the CPU 2a stores a "1" for the page number and the number of pages in the top entry of the page number table 3T, as shown in FIG. 16(b). If page number 4 is detected next, since page number 4 is the largest page number, the CPU 2a stores a "4" for the page number and a "1" for the number of pages corresponding to page number 4 in the next available entry after page number 1, as shown in FIG. 16(b).

However, if the current page number is not the largest value (S123: NO), then in S126 the CPU 2a determines whether the current page number is already stored in the page number table 3T, that is, whether the page number is a duplicate. If the page number is not a duplicate (S126: NO), then in S127 the CPU 2a inserts the current page number in the corresponding position of the page number table 3T.

For example, if the page number table 3T is in the state shown in FIG. 16(b) when the page number 2 is detected, then page number 2 is inserted between page number 1 and page number 4, as shown in FIG. 16(c).

However, if the page number is a duplicate (S126: YES), then in S128 the CPU 2a executes an error process for setting an error flag in a region allocated in the scanner driver, work area 2P, for example. One of the following steps may be performed in this error process.

(1) Image data for the currently scanned page is not saved.
(2) Image data for the page having the same number is replaced by the image data for the currently scanned page. In other words, image data for a page having the same number in the page number table 3T is deleted and image data for the currently scanned page is inserted in its place.
(3) The CPU 2a updates the page number table 3T by inserting image data for the current page so that image data for pages having the same page numbers are listed consecutively. For example, if image data is read for two pages having the page number 1, the number of pages corresponding to page number 1 in the page number table 3T is set to "2".

Next, a process for confirming the page number table in S107 of FIG. 13 will be described with reference to the flowchart in FIG. 17 and the table in FIG. 18. In S131 of the process in FIG. 17, the CPU 2a determines whether the error flag has been set in the process for sorting image data (S104 of FIG. 13). If the error flag has been set (S131: YES), then the process ends with no action.

However, if the error flag has not been set (S131: NO), then in S132 the CPU 2a reads the initial page number A (smallest page number) stored in the page number table 3T into the scanner driver work area 2P. In S133 the CPU 2a reads the last page number B (largest page number) stored in the page number table 3T into the scanner driver work area 2P.

In S134 the CPU 2a calculates a number of page numbers C using the equation (number of page numbers C)=(page number B)−(page number A)+1. Next, the CPU 2a finds the sum of the number of pages from entries in the number of pages corresponding to each page number in the page number table 3T. If the number of page numbers C matches the sum of the number of pages (S135: YES), then the CPU 2a determines that no error has occurred and ends the process, However, if the number of page numbers C does not match the sum of the number of pages (S135: NO), then in S136 the CPU 2a determines that an error has occurred and sets the error flag in the allocated region of the scanner driver work area 2P.

Since page numbers 1, 2, and 4 have been stored in the page number table 3T in the example of FIG. 18, the number of page numbers C equals 4−1+1, or 4. Further, the sum of the number of pages equals 1×3, or 3. Since the number of page numbers C (4) does not match the sum of the number of pages (3), the CPU 2a determines that an error has occurred. In this case, an error has occurred because page number 3 was not detected.

Figure 19:
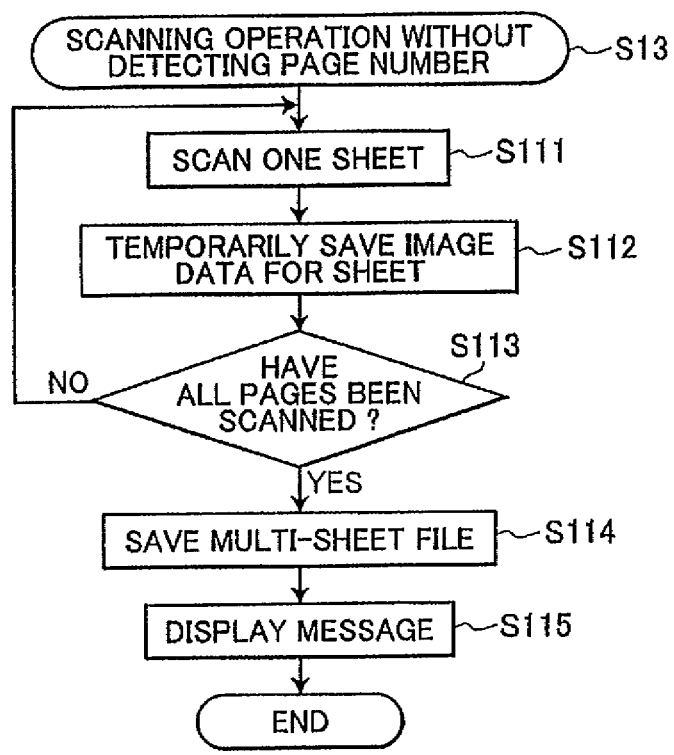
FIG. 19 is a flowchart illustrating steps in a usual scanning process.

A usual scanning process without detecting the page numbers will be described with reference FIG. 19. In S111, the CPU 2a transmits a command to the multifunction deice 10 to scan one sheet. In S112, the CPU 2a temporarily stores image data for the scanned sheet in a prescribed region of the scanner driver work area 2P or the hard disk 3. The processes in S111-112 are repeated successively for all sheets of the original have been scanned. In S113, the CPU 2a determines whether all sheets of the original have been scanned. If all sheets of the original have been scanned (S105: YES), then in S114 the image data for all sheets is compiled in a single file. In S115, the CPU 2a controls to display the results in the preview window H or in a window separate from the preview window H.

Since a page number detection region is added in response to the page number detection region being set, this construction reduces the burden on the user. Further, by making it possible to perform character recognition on only a limited region, character recognition can be completed quickly.

Generally, the target of character recognition, such as the page number, logo, or book title, is located in a peripheral part of the page. The personal computer 1 can store a prescribed region in the peripheral part of the page as the page number detection region and can set the page number detection region to only a desired page number detection region that the user selects from the pull down menu of page number detection regions. Since the CPU 2a adds the page number detection region in response to the page number detection region being set, the image-reading device reduces the burden on the user.

For example, in the case of a page number, the data targeted for character recognition is a numeral. In this case, the CPU 2a can set and edit the page number detection region to detect the numeral, without requiring user operations.

When page numbers have a prescribed positional relationship, such as a left-to-right symmetry or top-to-bottom symmetry, as when reading a two-page layout from a book or when reading a two-in-one original (a single-page document on which two pages have been printed), it is possible to set one page number detection region as a reference position and to set (i.e. edit) the other page number detection region based on the positional relationship. Since the CPU 2a can set the second page number detection region based on the first page number detection region, the personal computer 1 reduces the burden on the user.

With this construction, the user can confirm the state of the page number detection region when the scanning operation is performed.

With this construction, the multifunction device 10 can read an original document and perform character recognition in an page number detection region that has been set and edited with little burden on the user, thereby reducing the time required for setting and editing the page number detection region and reducing the time required for reading the original document and performing character recognition over the conventional devices.

The CPU 2a can adjust the page number detection region to an appropriate position and size based on the original document, thereby reducing the burden on the user to set the page number detection region. Further, since character recognition need not be performed over the entire original document to recognize the page number, the time required for image reading that includes recognition of the page number can be shortened. Further, the image-reading device can handle errors such as duplicate page numbers in addition to skipped pages caused by multi-feeds.

The CPU 2a can determine page reading errors based solely on the recognized page number, thereby shortening the time required for image reading including the recognition of page numbers and shortening the time required for determining page reading errors.

The CPU 2a does not merely detect page reading errors and report the errors to the user, but also performs appropriate actions to resolve the error. In this way, the scanner system 100 can make effective use of the read image data, eliminating any user operations required for rereading the original document.

If Image data for the currently scanned page is not saved in the error process, image data previously read for the original document is saved as the correct data, preventing data for the same page being saved twice.

If image data for the page having the same number is replaced by the image data for the currently scanned page in the error process, image data read subsequently for an original document is saved as the correct data, thereby preventing image data for the same page being saved twice and enabling previously read image data for an original document in a poor state to be replaced by image data for an original document in a good state.

If in the error process, the CPU 2a updates the page number table 3T by inserting image data for the current page so that image data for pages having the same page numbers are listed consecutively, all image data with a recognized page number is saved, thereby eliminating the need for the user to rescan an original document. Hence, after the original is read and the image data saved, the user can use a commercial image editor to browse the saved image data, rearrange data or change the page numbers in a continuing flow of operations, without backtracking, thereby improving operational efficiency for the user.

If in the error process, the CPU 2a updates the page number table 3T by inserting image data for the current page so that image data for pages having the same page numbers are listed consecutively, the CPU 2a can determine that a page reading error such as a skipped page has occurred when a page having no page number is read. However, since all pages are read, even though an error was determined, the user can take appropriate measures to resolve the problem, such as assigning the missing page number.

<Modification>

Next, a modification of the process for sorting image data of S104 in FIG. 13 will be described with reference to FIG. 20. This process handles cases in which pages assigned no page number have been scanned, such as pages inserted between separate chapters. In S141 of this process, the CPU 2a controls the image processor 7 in the same manner as in S121 (FIG. 14) to detect the page number from the specified page number detection region. In S142 the CPU 2a reads the page number table 3T from the scanner driver work area 2P.

If no page number has been detected on the current sheet (S143: NO), then in S146 the CPU 2a adds the image data as the last page stored in the page number table 3T. However, if a page number has been detected (S143: YES), then in S144 the CPU 2a sets a flag in the page number table 3T indicating that image data was read for the corresponding page number.

Figure 14:
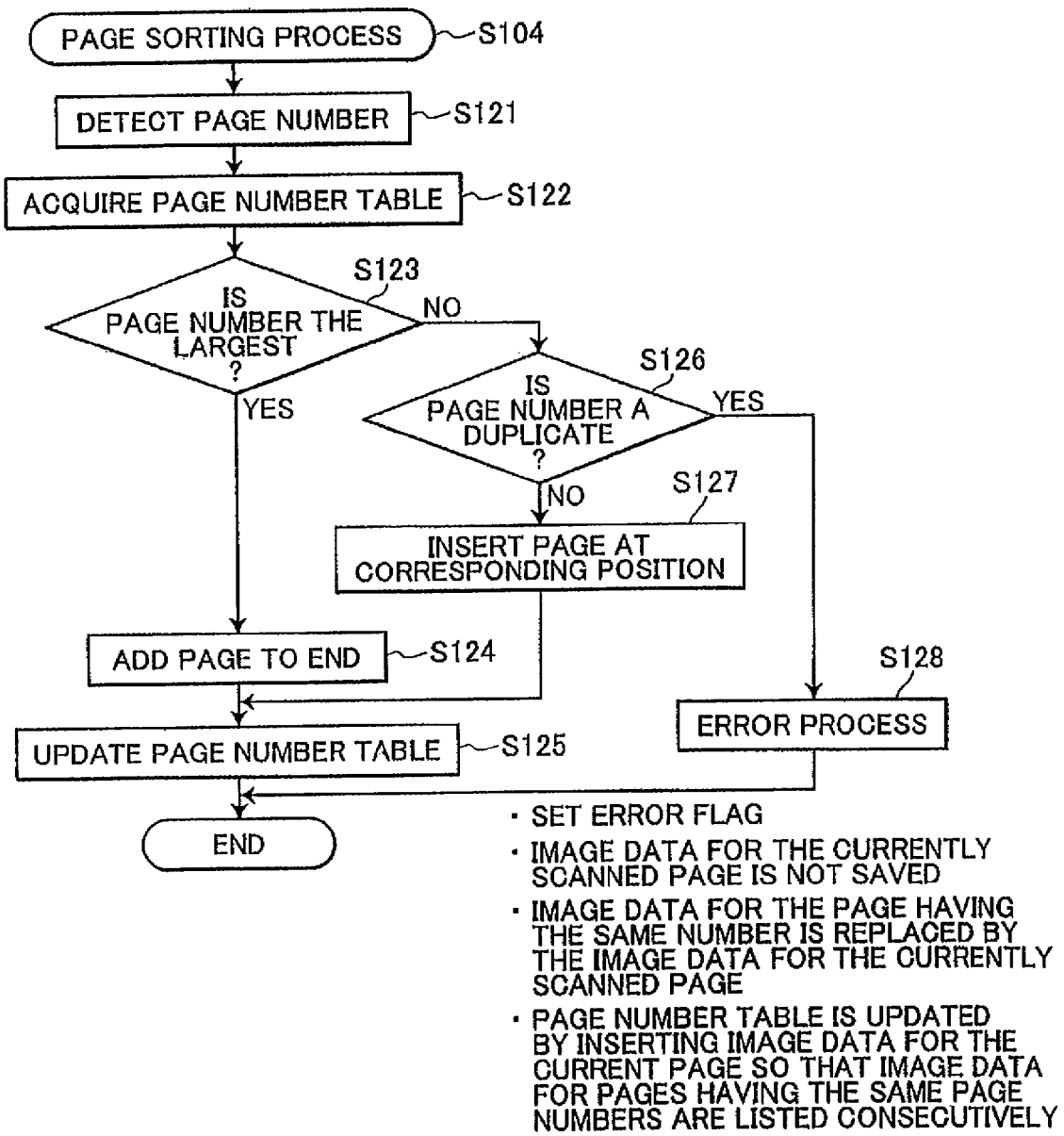
FIG. 14 is a flowchart illustrating steps in a page sorting process.

The processes in steps S145-S150 are identical to those in S123-S128 of FIG. 14, and therefore a description of these steps will not be repeated here.

Figure 20:
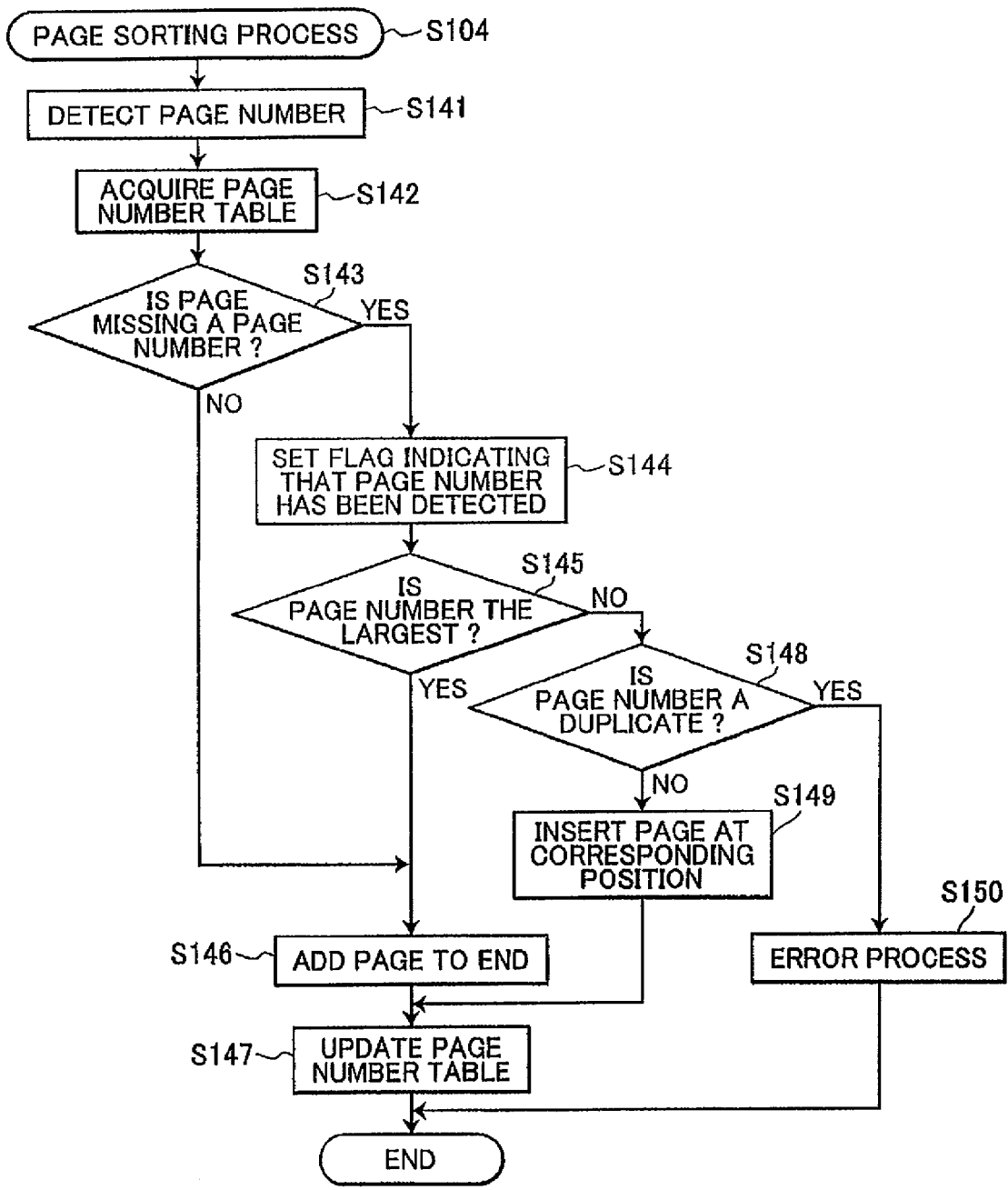
FIG. 20 is a flowchart illustrating steps in a modification of a page sorting process.

FIGS. 21(a)-21(b) show examples of the page number table 3T used in the page sorting process of FIG. 20. As shown in FIG. 21(a), the page number table 3T stores the page numbers detected in image data of scanned pages, the number of pages for which the page number has been detected (1 when the scanning process is normal), and a flag indicating the existence of a page number in the image data. In FIG. 21(a), pages 1 through 3 have been read from the original document, and a page number has been detected for each page. From the state shown in FIG. 21(a), if a page number is not detected in image data from the next scanned page, then a "4" is entered for the page number in the entry following page number 3 at the bottom of the table, and the flag is set to "0" to indicate that no page number was detected, as shown in FIG. 21(b).

FIG. 22(a) shows an example in which image data has been stored for two successive pages in which no page number was detected. The page number 1 and 2 are assigned temporarily to the two successive pages. If the page number 2 is detected in image data for the next scanned page, as shown in FIG. 22(b), the page assigned the page number 2 is re-assigned to a page number for which no data has been stored, such as page number 0 to prevent from assigning a same page number to the different pages.

Some pages do not have page numbers, such as chapter separating pages. Conventionally reading this type of page would result in a page reading error, but the CPU 2a saves this image data together with image data having page numbers according to sorting rules, rather than determining an error has occurred because a page number was not recognized. The scanner system 100 of the present invention can also handle cased in which the reading target is not arranged according to page number. Therefore, the image-reading device having this construction prevents backtracking by not requiring the user to rescan an original document, thereby improving operational efficiency for the user.

<Second Embodiment>

Figure 23:
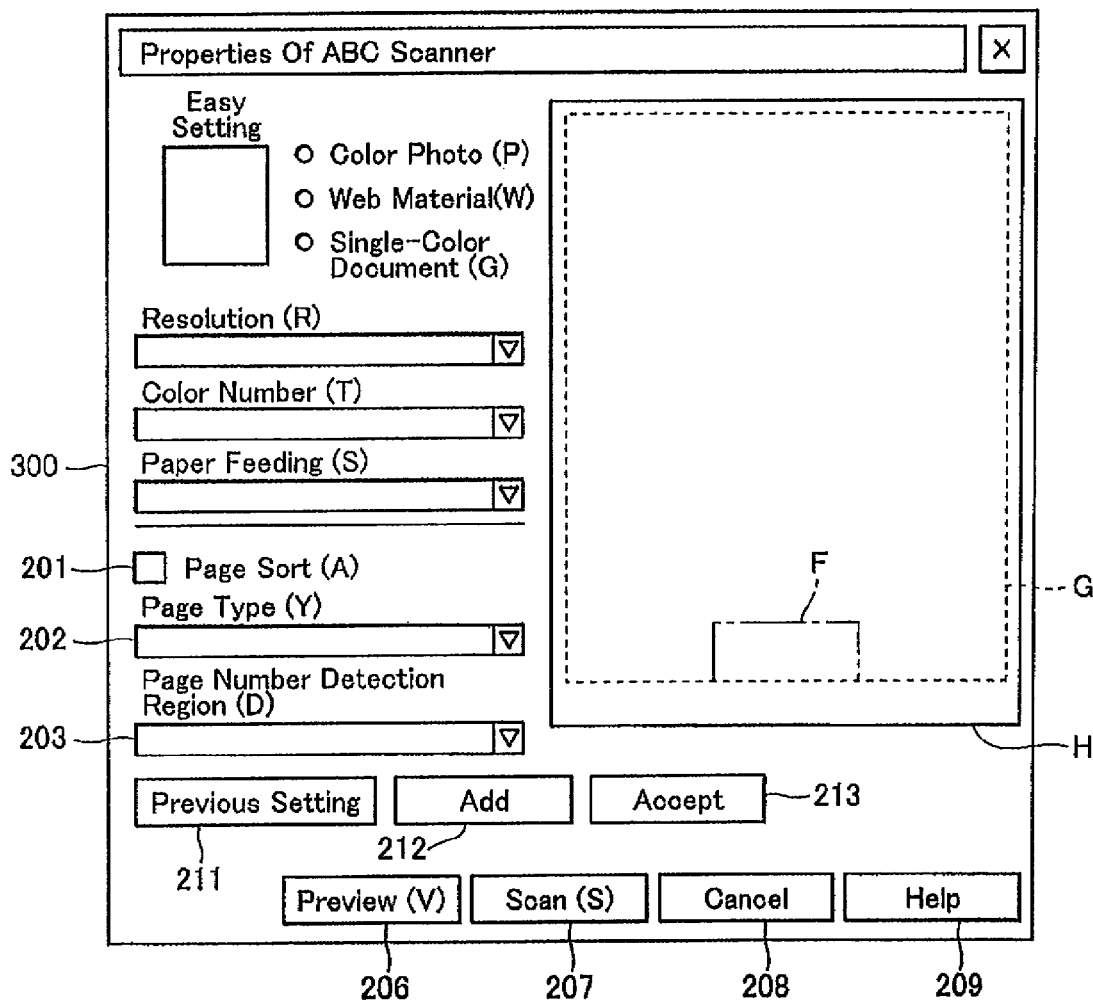
FIG. 23 is a screen shot showing a dialog window for setting the scanning mode of a second embodiment.
Figure 24:
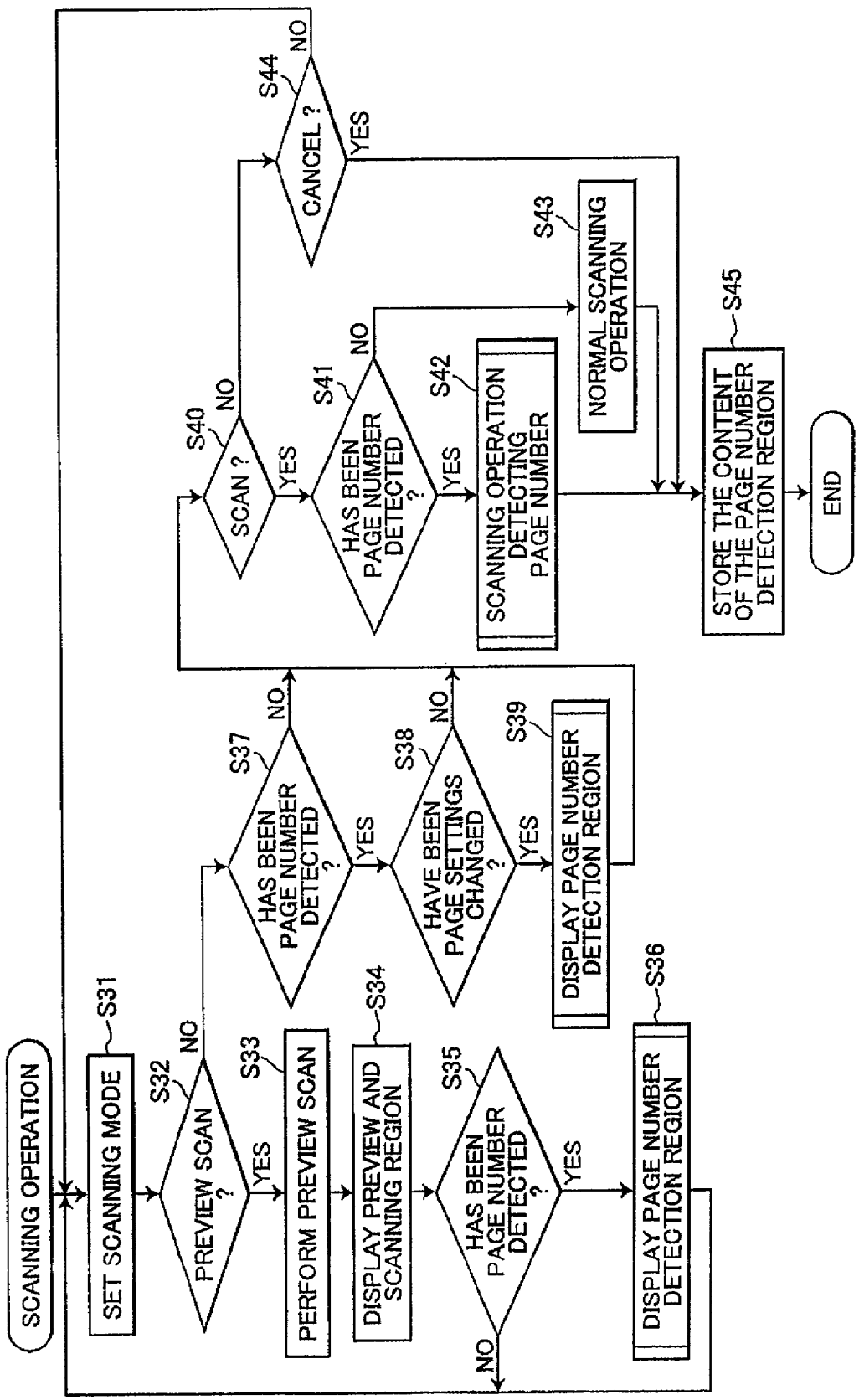
FIG. 24 is a flowchart illustrating steps in an image reading process for the second embodiment.
Figures 25, 26:
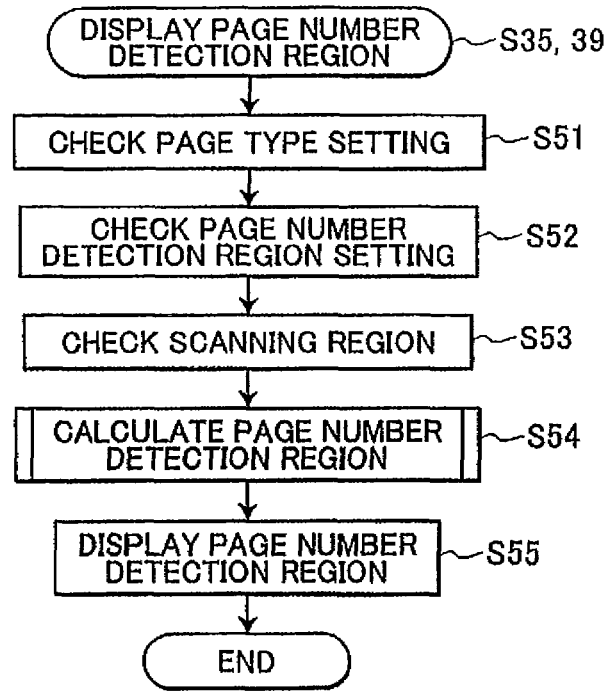
FIG. 25 is a table showing a storage format example for the page number detection region.
FIG. 26 is a flowchart illustrating steps in a process for displaying the page number detection region for the second embodiment.

Next, a second embodiment of the image-reading process according to the present invention will be described with reference to FIGS. 23-28. As shown in FIG. 23, a dialog window 300 of the second embodiment is the same as that of the first embodiment except that the dialog window 200 of the second embodiment has a previous setting button 211, an add button 212, and an accept button 213 instead of the box 204, 205 of the width M and the height N for the size of the page number detection region, As shown in FIG. 24, the image-reading process of the present embodiment is identical to the image-reading process of the first embodiment shown in FIG. 7 except for S36, S39 and S45. Thus, a description of steps identical to the first embodiment will not be repeated here. In the process of FIG. 24, if the CPU 2a determines that all pages have been scanned (S105: YES or S113: YES), then in S45 the CPU 2a stores in the hard disk drive 3 the content of the page number detection region in the scanning operation. An example of the stored content is shown in FIG. 25. The content of the page number detection region includes a number or name for identifying the stored page number detection region, the page type, coordinates of the upper left corner (or a center point) of the page number detection region, the widthwise dimension of the page number detection region, and the height of the page number detection region. When setting subsequent page number detection regions, the stored page number detection regions can be selected from the Page Number Detection Region pull-down menu in the dialog window of FIG. 25.

Next, the process for displaying the page number detection region of S36 and S39 in FIG. 24 will be described with reference to FIG. 26. S36 is identical to S39. In S51 of the process, the CPU 2a checks the page type of the scanned region G displayed in the preview window H in the dialog window 300 shown in FIG. 23. If the user has checked the box 201 to the left of "Page Sort" (S35: YES or S37: YES in FIG. 24), then the previously set page number detection region F that has been set in the previous scanning operation and that is saved in a prescribed region of the hard disk drive 3 is displayed in the preview window H. In the example of FIG. 23, the page type has been set to "one portrait page," and the page number detection region F has been set to "bottom center," The previously set page number detection region F is displayed also when the user clicks the previous setting button 211. Accordingly, when the user clicks the previous button, the previous setting of the page number detection region is displayed. Thus, the user can skip a complicated operation for the setting of the page number detection region.

If the user wishes to modify the page type, the user can click on the triangle symbol in the right part of page type field 201 in the dialog window 300 of FIG. 23 to display the pull-down menu shown in the part (a) of FIG. 5 and can select one of the page types from the displayed menu. FIGS. 8(a)-8(d) show examples of the different page types. If the previous settings indicate a page type of "one portrait page" and a page number detection region of "bottom left and right," then page number detection regions Fa1 and Fa2 will be displayed in the preview window H, as shown in FIG. 8(a). The page number detection regions displayed in the preview window H will change to Fb1-Fb4, shown in FIG. 8(b), when the user changes the page type to "two portrait pages"; Fc1 and Fc2, shown in FIG. 8(c), when the user changes the page type to "one landscape page"; and Fd1-Fd4, shown in FIG. 8(d), when the user changes the page type to "two landscape pages."

In S52 the CPU 2a checks the page number detection region and in S53 the CPU 2a checks the size of the scanned region G. While the scanned region G is generally set equivalent to the size of the scanned document, the user can modify the size of the scanned region G with the mouse.

In S54 the CPU 2a performs a process to calculate the page number detection region in order to edit the page number detection region F, as will be described later. The results of this process will be displayed in the preview window H in S55.

Next, the process for calculating the page number detection region in S54 of FIG. 26 will be described with reference to FIGS. 27(a)-27(c) and 28. Using the mouse, the user clicks on the border of the page number detection region displayed in the preview window H of FIG. 23 (F in this example) to change the size or move the position of the page number detection region F. When adding a new page number detection region, the user clicks on the Add button 212 in the dialog window 300 of FIG. 23 and specifies the start point and end point of the page number detection region to add. Specifically, a rectangular page number detection region is added with the start position set to the position of an initial mouse click and the end position set to the position of the next mouse click.

When the user clicks on the Accept button 213, the CPU 2a edits the page number detection region(s) in order to handle two-page spreads in a book. At this time, the CPU 2a determines in S61 of the process in FIG. 28 whether the page type is set to a single page with a single page number per page. If the page type is set to a single page, such as "one portrait page," as in the examples of FIGS. 27(a) and 27(b) (S61: YES), then in S62 the CPU 2a finds the position (coordinates) and the length of each edge (M and N) for a rectangular shaped page number detection region from the scanned region G, as shown in FIG. 10(a). In S63 the CPU 2a edits the page number detection region by adding a new page number detecting region or adjusting the size of the page number detection region based on the position found in S62 and in S64 displays the edited results in the preview window H.

Figure 27A:
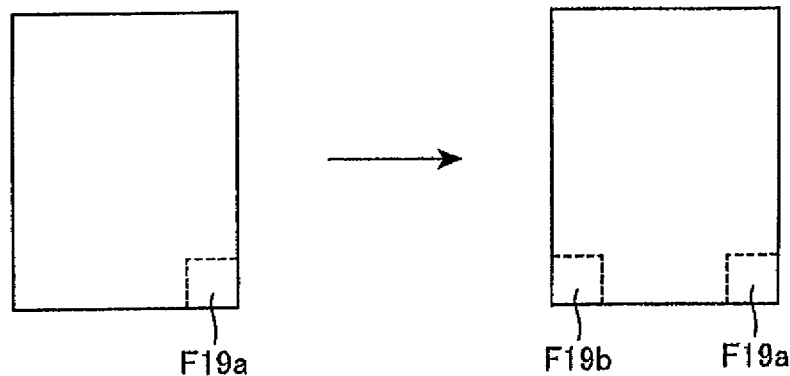
FIGS. 27(a)-27(c) are explanatory diagrams showing an example of editing the page number detection region.
Figure 27B:
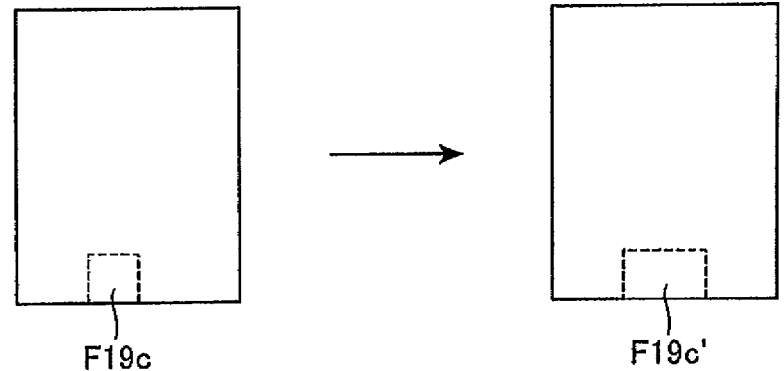

In the example of FIG. 27(a), the user has set a page number detection region F19a in the bottom right of the page. Subsequently, the CPU 2a adds a new page number detection region Fl9b to a position having left-right symmetry with the page number detection region F19a with respect to a vertical line through the page. Hence, the CPU 2a corrects the page number detection regions to "bottom left and right." In the example of FIG. 27(b), the user has set a page number detection region F19c near the bottom center. However, since the page number detection region F19c is positioned slightly left of center and is slightly undersized in the width direction, the CPU 2a edits the page number detection region F19c to a position in the "bottom center" and increases the widthwise size of the same. Thus, the CPU 2a sets the edited page number detection region F19c' as shown in the right hand side of FIG. 27(b). Edit may also be performed on these page number detection regions to add new page number detection regions (not shown) at positions with top-bottom symmetry, as in the top left and right in FIG. 27(a) and the top center in FIG. 27(b).

Figure 27C:
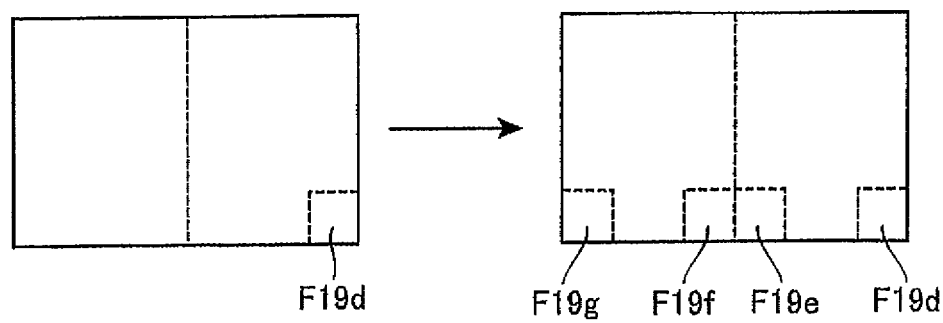
Figure 28:
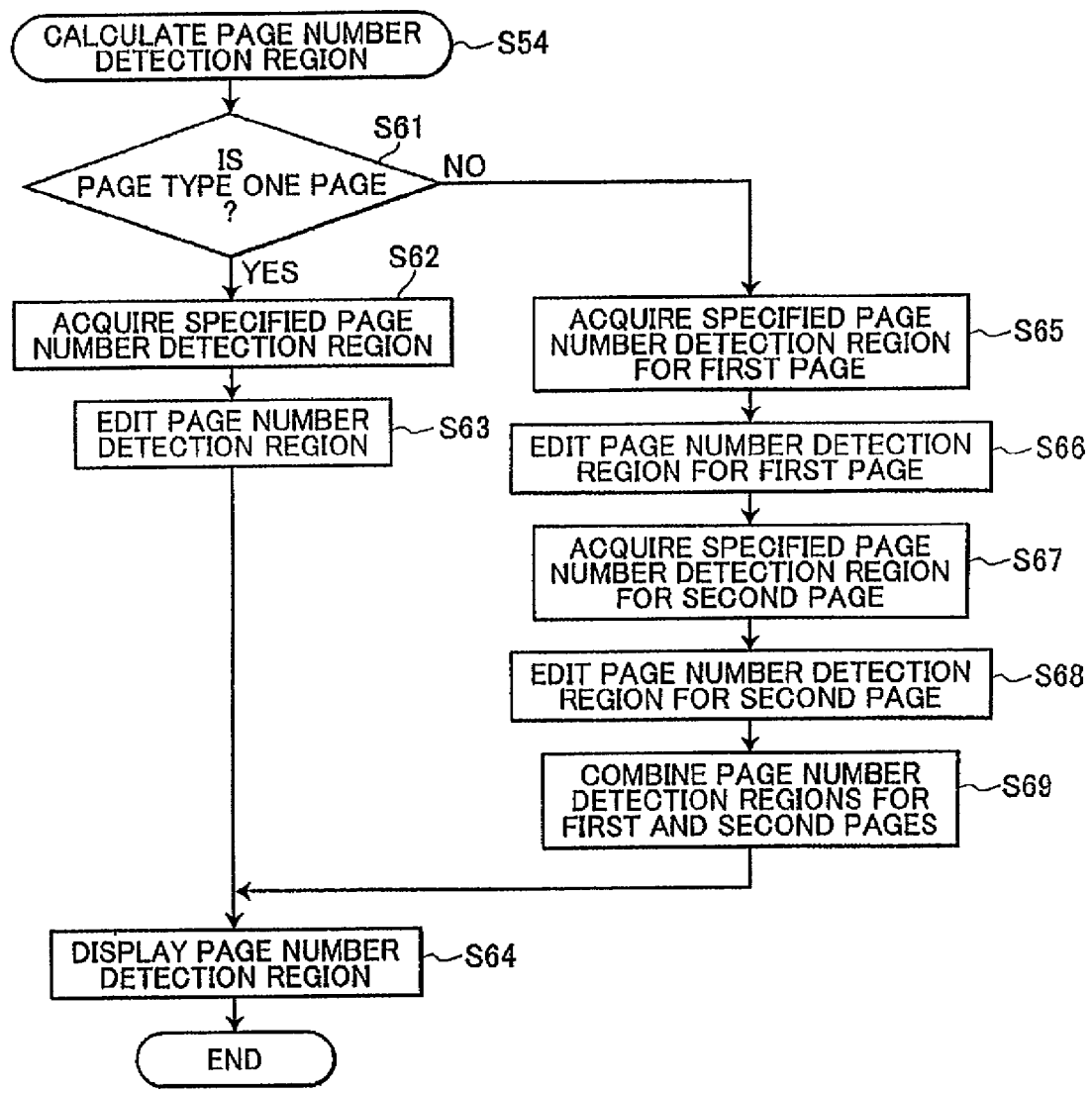
FIG. 28 is a flowchart illustrating steps in a process for calculating the page number detection region of the second embodiment.

However, if the page type is "two portrait pages," as shown in FIG. 27(c), wherein each scanned sheet of the original includes two pages with a page number on each page (S61: NO), then in S65 the CPU 2a finds the position and length of each side (M and N) for the page number detection region set for the first page, where the first page is the page on the right and the second page is the page on the left. In S66 the CPU 2a edits the page number detection region for the first page by adding a new page number detection region or modifying the size of the page number detection region based on the position found in S65. In S67 the CPU 2a finds the position and length of sides of the page number detection region for the second page, and in S68 edits this page number detection region by adding a new page number detection region or adjusting the size based on the position found in S67. In S69 the CPU 2a combines the results of editing the first and second pages and in S64 displays these results in the preview window H.

In the example of FIG. 27(c), the user has set a page number detection region F19d in the bottom right position of the first page, which is the page on the right side. Subsequently, the CPU 2a adds a new page number detection region F19e to a position having left-right symmetry with the page number detection region F19d across a vertical line in the page (bottom left). Hence, the CPU 2a edits the page number detection region to "bottom left and right." Based on these results, the CPU 2a adds page number detection regions F19f and F19g to the bottom left and right positions in the second page, which is the page on the left side. As in FIG. 27(a), the page number detection regions for each page in FIG. 27(c) can be edited to the "top left and right" positions.

With this construction, the user can freely set a page number detection region, thereby reducing the burden on the user.

The image-reading device having this construction can set, edit, and store the page number detection region without any user operations. Further, the stored page number detection region can be used for setting subsequent page number detection regions.

By clicking the accept button 213, the user can view the state of a newly added page number detection region on a display.

By clicking the scan button 207, the user can issue a command to execute the scanning operation to read an original document and to execute character recognition after confirming whether the set and edited page number detection region is appropriate, thereby preventing operations for reading the original document and recognizing characters therein from being executed when the set and edited page number detection region is incorrect.

<Third Embodiment>

Figure 29:
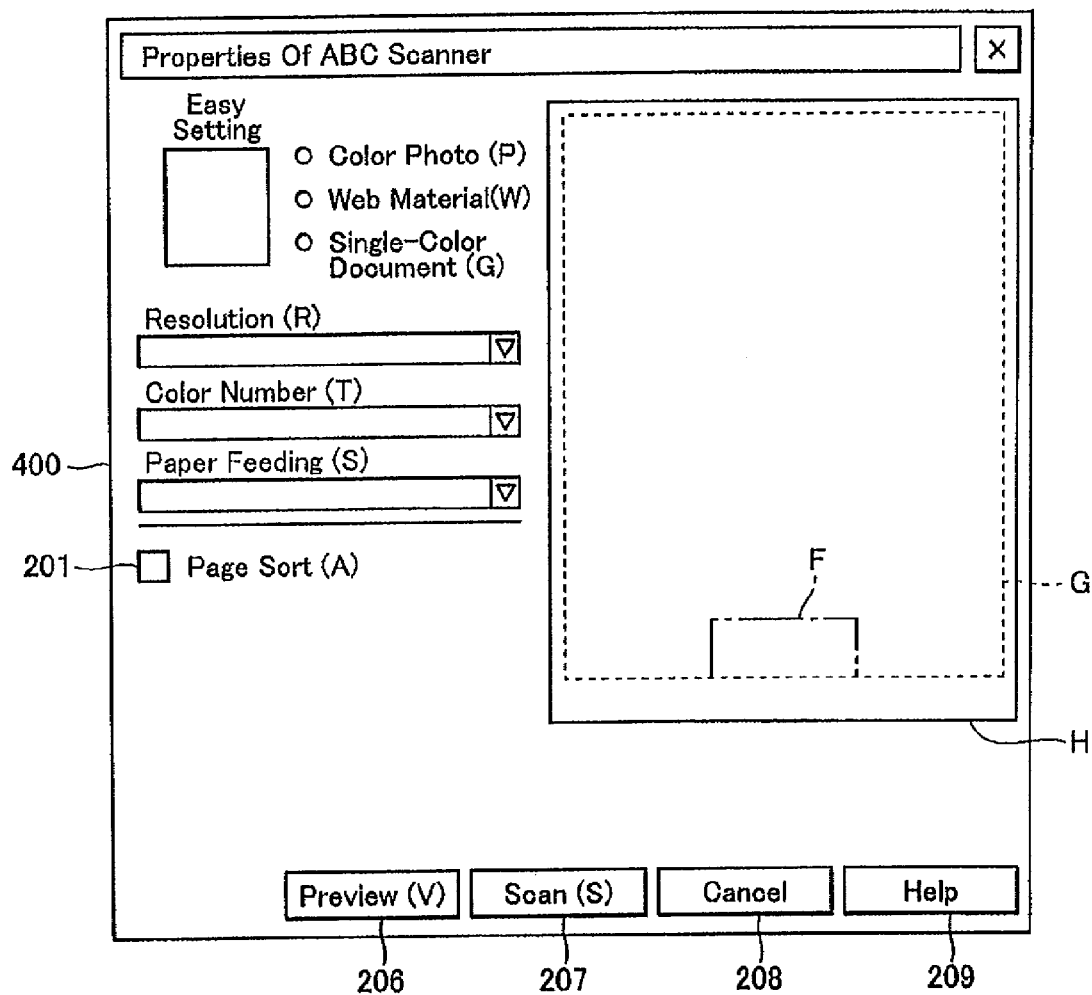
FIG. 29 is a screen shot showing a dialog window for setting the scanning mode of a third embodiment.

Next, an image-reading process according to a third embodiment will be described with reference to FIGS. 29-32. The page number detection regions are automatically sets in the third embodiment. Thus, by comparison with the dialogue window 200 of the first embodiment (FIG. 4), the diagonal window 400 of the third embodiment as shown in FIG. 29 is absent the pull down menus for the page type, the page number detection region, the entry field of the width M and the height N for the size of the page number detection region. Thus, the user does not set the page type or the page number detection region.

Figure 30:
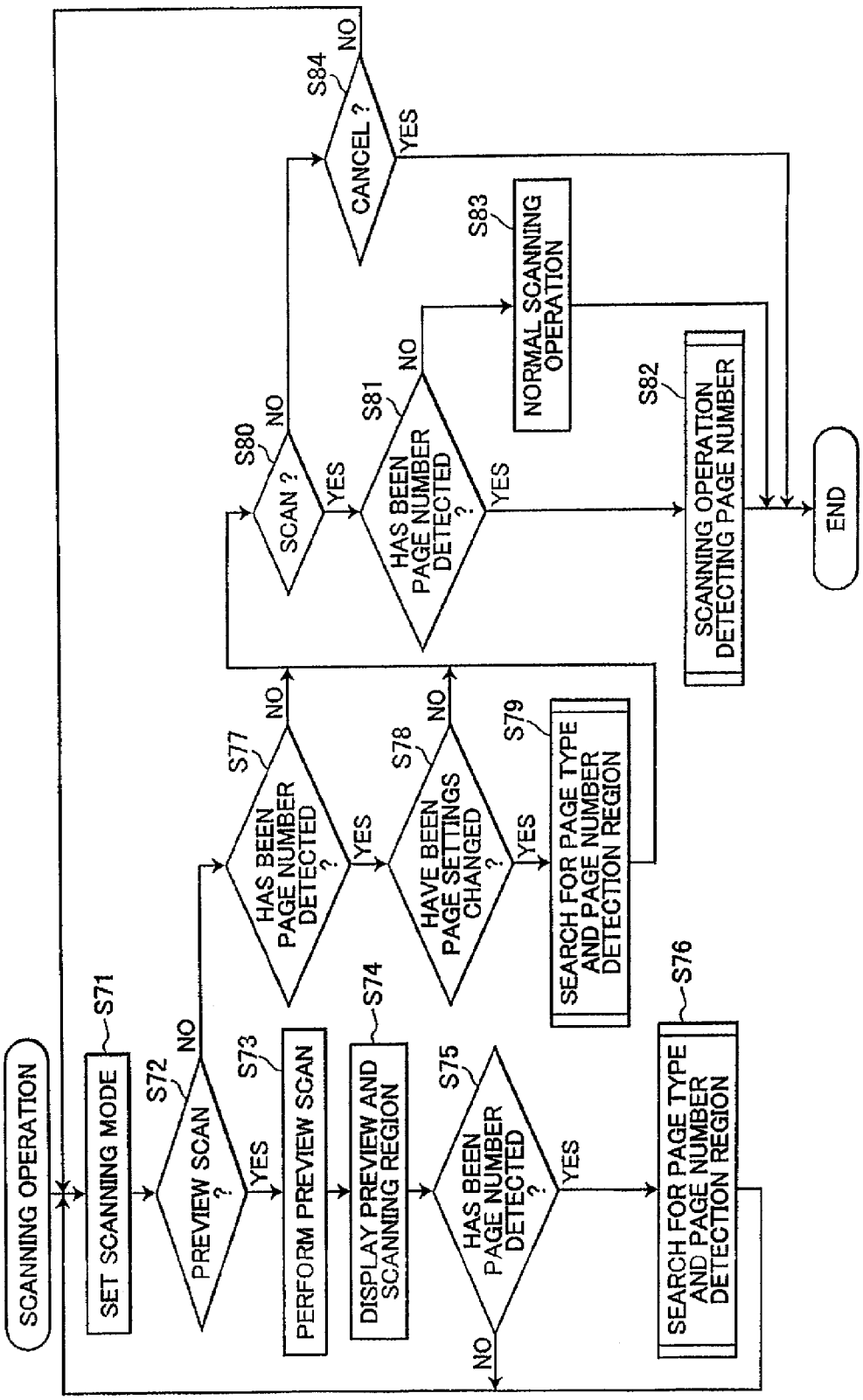
FIG. 30 is a flowchart illustrating steps in an image reading process of the third embodiment.

The image-reading process of the third embodiment as shown in FIG. 30, is identical to the image-reading process of FIG. 7 in the first embodiment except for S76, and S79. A description of the identical steps will not be repeated here.

Figure 31:
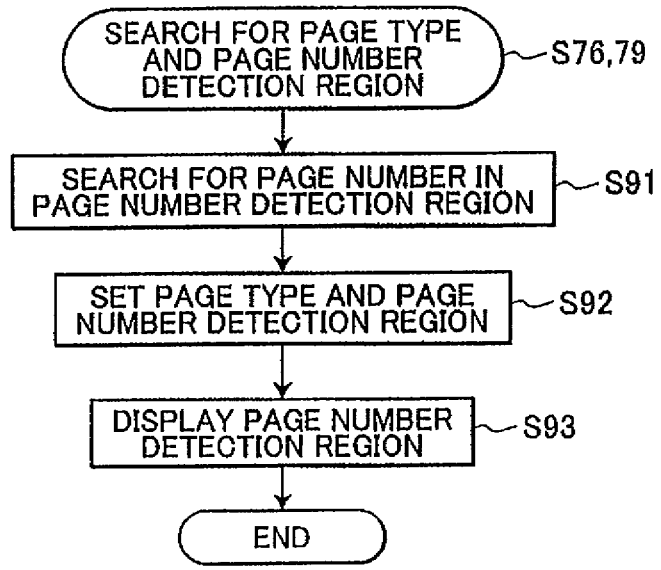
FIG. 31 is a flowchart illustrating steps in a process for searching page type and page number detection region.
Figure 32:
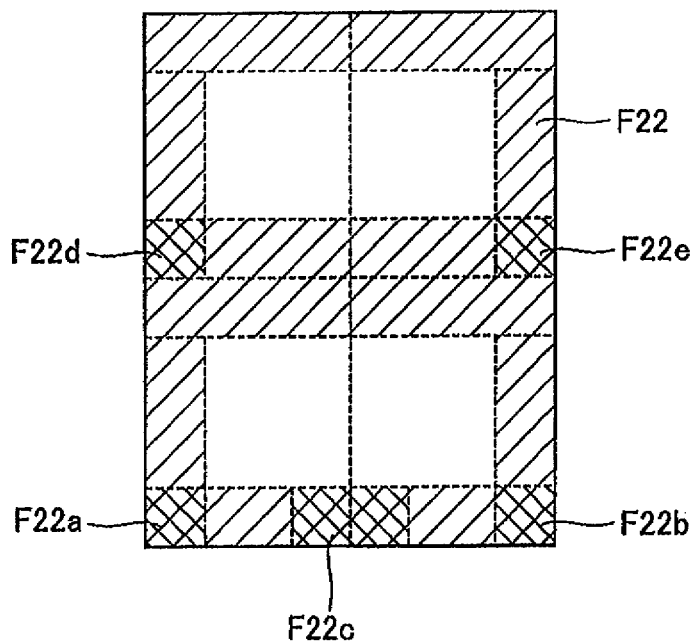
FIG. 32 is an explanatory diagram showing an example of the page number detection region.

A process for searching for a page type and page number detection region in S76 and S79 of FIG. 30 will be described with reference to FIGS. 31 and 32. In S91, the CPU 2a searches for a page number in a prescribed page number detection region F22 of the image data scanned in the previous scan. FIG. 32 shows an example of a page number search region F22. Data in the page number search region F22 is stored in the list of page number detection regions 3L of the hard disk drive 3 as coordinate data. By searching the page number search region F22, the CPU 2a can detect the page number detection region of the top, top center, top left and right, bottom, bottom center, bottom left and right, or entire page of the page type for "one portrait page," "one landscape page," "two portrait pages," or "two landscape pages." Data in the page number search region F22 is stored in the list of page number detection regions 3L of the hard disk drive 3 as coordinate data.

In S92 the CPU 2a sets the page type and page number detection region based on the results of this search. In S93, the CPU 2a edits the page number detection region and displays the results in the preview window H.

For example, if in S91 the CPU 2a detects a page number in only the region F22a, in S92 the page type is set to "one portrait page" and the page number detection region F22a is in the bottom left. In S93, the CPU 2a adds a region (F22b) having left-right symmetry with the region F22a as the page number detection region and sets the page number detection region to "bottom left and right." Further, if in S91 the CPU 2a detects a page number in only the region F22c, in S92 the CPU 2a sets the page type to "one portrait page" and the page number detection region to "bottom center." Further, if in S92 the CPU 2a detects a page number in both the regions F22a and F22d, in S92 the CPU 2a sets the page type to "two landscape pages". In S93, adds the regions F22b and F22e as the page number detection region.

The target of character recognition, such as a page number, logo, or book title, is often found in a fairly common location, such as a peripheral part of the original document. The CPU 2a can set the common location to the page number search region F22 and detect data to be the target of character recognition. By doing so the CPU 2a can set and edit the page number detection region more accurately, without requiring user operations.

<Fourth Embodiment>

Figure 34:
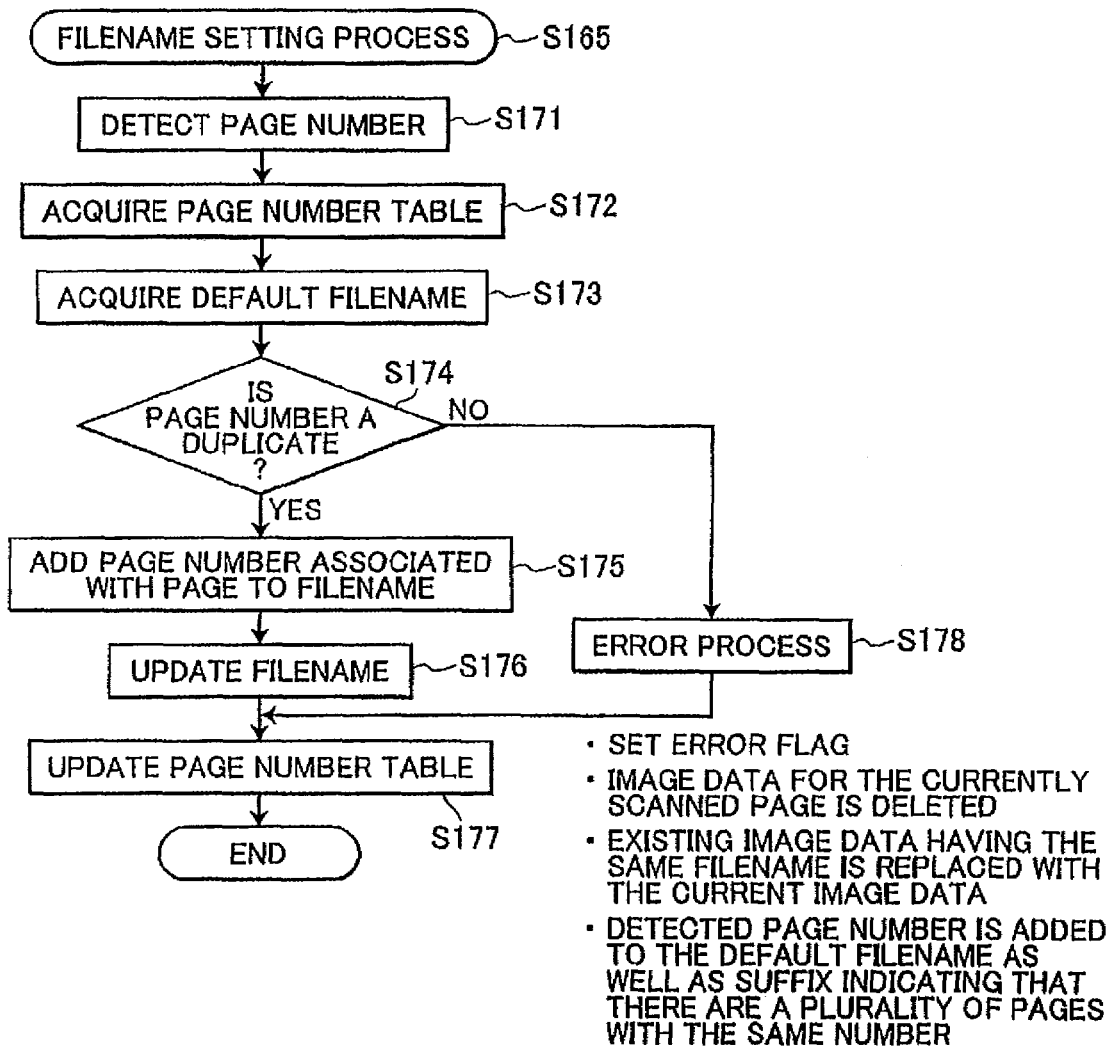
FIG. 34 is a flowchart illustrating steps in a filename setting process.
Figure 35:
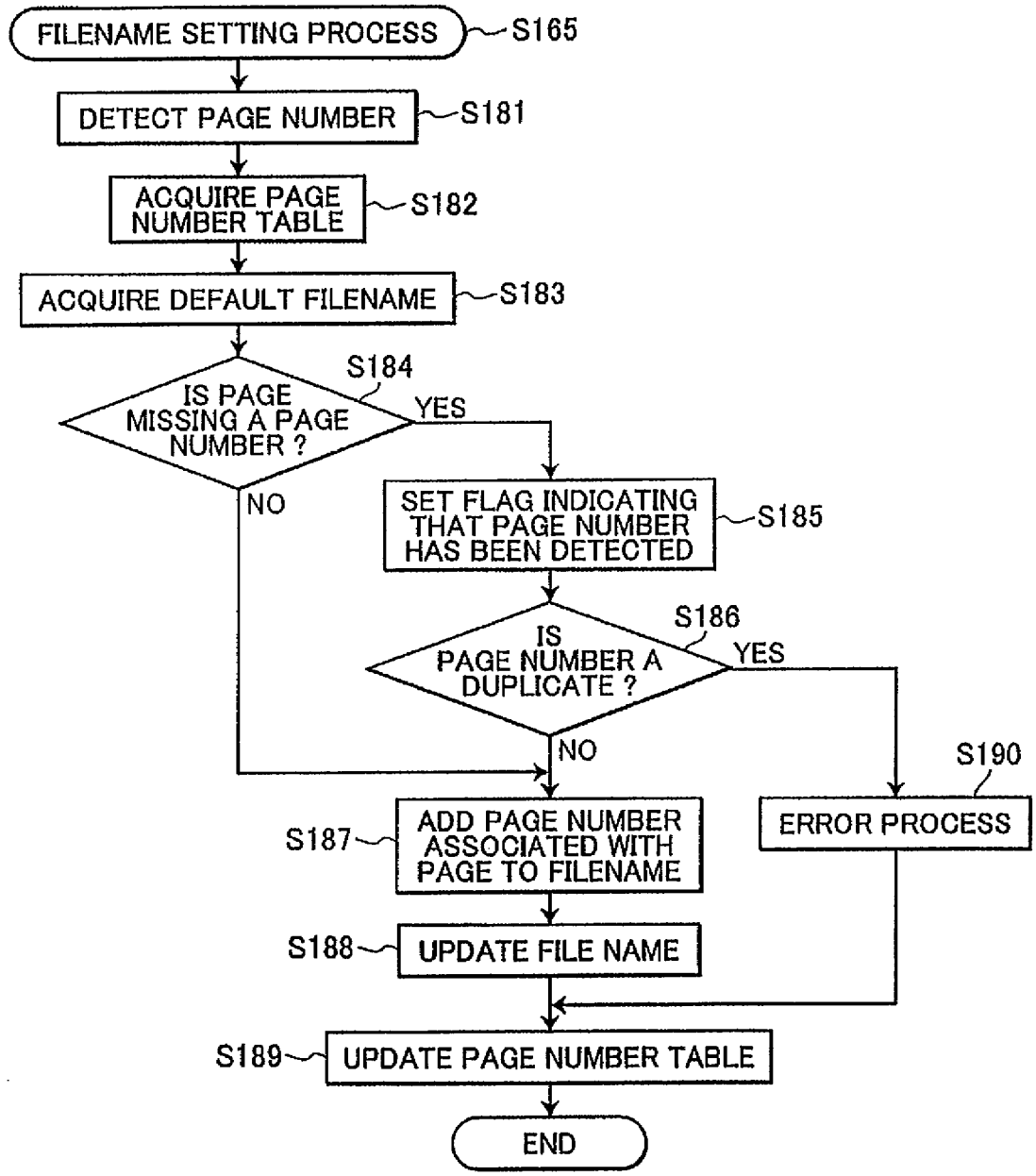
FIG. 35 is a flowchart illustrating steps in another filename setting process.

Next, the image-reading process according to a fourth embodiment is described with reference FIGS. 33-35. In the fourth embodiment, the image-reading process is same as that of the first embodiment shown in FIG. 7 except for step S12. Unlike the process described in FIG. 13 for generating a multi-page file by saving image data for all scanned pages as a single file, this process stores image data for each scanned page as a separate file.

Figure 33:
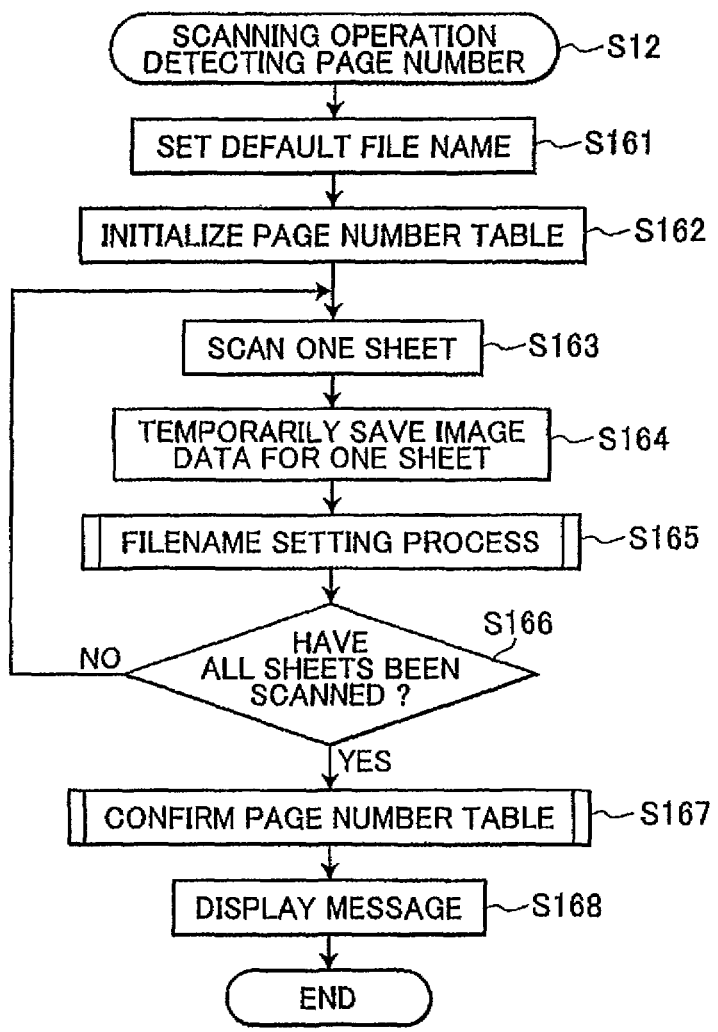
FIG. 33 is a flowchart illustrating steps in a scanning process of a fourth embodiment.

First, in S161 of the process in FIG. 33, the CPU 2a sets a default filename. The default filename is a shared part of a filename for storing image data of scanned pages, such as a character string for the date or the title of the original document. The user sets the default filename in a dialog window (not shown) displayed by clicking the Scan button 207 in the dialog window of FIG. 5, for example. The name set in this dialog window is saved in the scanner driver work area 2P.

Next, In S162, the CPU 2a initializes the page number table 3T shown in FIG. 16(a). In S163, the CPU 2a transmits a command to the multifunction device 10 to scan the sheet that has been previewed. In S164, the CPU 2a temporarily stores the second scanned image data in a prescribed region of the scanner driver work area 2P or the hard disk drive 3. In S165, the CPU 2a performs a process for setting the filename, described later, based on the page number(s) that is detected when scanning the image data of the current sheet. The process in S163-S165 is repeated for all sheets in the original document.

When all sheets of the original have been scanned (S166: YES), in S167 the CPU 2a performs a process to confirm the page number table, as described in the first embodiment (FIG.

17). In S168 the CPU 2a displays the results in the dialogue window, in the same manner as in S108 of the first embodiment (FIG. 22).

Next, the filename setting process in S165 of FIG. 33 will be described with reference to FIG. 34. In S171 of the process in FIG. 34, the CPU 2a controls the image processor 7 to detect the page number in each specified page number detection region according to the same method as described in the first embodiment. In S172 the CPU 2a reads the page number table 3T, such as that shown in FIG. 16(a), into the scanner driver work area 2P. In S173 the CPU 2a references the default filename. In this example, the default filename has been set to the date of the scanning operation, such as 20051202.

In S174 the CPU 2a determines whether the page number detected in the current scanning operation is already stored in the page number table 3T, In other words, the CPU 2a determines whether the page number duplicates a page number already stored in the page number table 3T. If the page number does not duplicate another number (S174: NO), then in S175 the CPU 2a sets the filename for the image data of the currently scanned page by adding the detected page number to the default filename. In S176 the CPU 2a stores the scanned data sorted in the storage area for scanned data 3R of the hard disk drive 3 in a prescribed file format. Therefore, when storing image data according to the TIFF (tag image file format) format and when the page number detected in the image data is "10", the filename becomes 20051202_10.tif. When one page number is detected for one scanned sheet as the case for one portrait page, the file name is set based on the detected page number. When the plurality of page numbers is detected for one scanned sheet as the case for two portrait page, the file name is set based on a representative page number, for example a left most page number in the scanned sheet.

In S177 the CPU 2a stores the page number(s) detected in the current scan in the page number table 3T, as in the example of FIG. 16(b).

However, if the detected page number duplicates a number already stored in the page number table 3T (S174: YES), then in S178 the CPU 2a sets the error flag in a region allocated in the scanner driver work area 2P and executes an error process according to one of the following methods.
(1) Delete image data for the currently scanned page.
(2) Replace existing image data having the same filename with the current image data. In other words, delete the file having the same filename and store the image data for the currently scanned page with the same filename.
(3) Add the detected page number to the default filename, as well as a suffix indicating that there are a plurality of pages with the same page number, such as 20051202_10(2).tif. In the case (3), the number of pages for the corresponding page number in the page number table 3T is updated. Hence, if the number of pages is "1", then the number of pages is incremented to "2".

If the CPU 2a adds the detected page number to the default filename, as well as a suffix indicating that there are a plurality of pages with the same page number, it is possible to avoid duplicate names when names are applied to each entry of image data (each page number), for example. Further, since the image-reading device saves all image data for which a page number has been recognized, the user need not rescan the original or otherwise backtrack, thereby improving the operational efficiency for the user.

<Modification of the Fourth Embodiment>

Next, another filename setting process corresponding to S165 of FIG. 33 will be described with reference to FIG. 35. This process supports cases in which pages assigned no page number are, such as pages inserted between separate chapters. In S181 of the process in FIG. 35, the CPU 2a controls the image processor 7 according to the method described above to detect the page number in the specified page number detection region. In S182 the CPU 2a reads the page number table 3T, such as that shown in FIG. 21(a), 21(b), from the scanner driver work area 2P. In S183 the CPU 2a references the default filename.

In S184, the CPU 2a determines whether a page number is detected. If a page number is not detected (S184: NO), then in S187 the CPU 2a sets the filename for the scanned image data by adding a page number not already stored in the page number table 3T to the default filename and in S188 stores the scanned data in the storage area for scanned data 3R of the hard disk drive 3 according to the TIFF or other prescribed file format. In S189 the CPU 2a stores the page number, the number of page and data indicating that the page number could not be read in the page number table 3T shown in FIG. 21(a).

However, if a page number is detected (S184: YES), then in S185 the CPU 2a sets a flag in the page number table 3T indicating that a page number is detected in the scanned page. In S186 the CPU 2a references the page number table 3T to determine whether the currently detected page number has already been stored in the page number table 3T. If the currently detected page number has not yet been stored in the page number table 3T (S186: NO), then in S187 the CPU 2a sets the filename for the scanned image by adding the detected page number to the default filename (for example, 20051202_10) as described in fourth embodiment and in S188 stores the data in the storage area for scanned data 3R of the hard disk drive 3 according to the prescribed file format. In S189 the CPU 2a stores the currently detected page number, data indicating that the page number was detected, and the number of scanned pages (1) in the page number table 3T.

If the detected page number duplicates another number stored in the page number table 3T (S186: YES), then in S190 the CPU 2a performs an error process in the same manner as described in S178 of FIG. 31.

While the invention has been described in detail with reference to specific embodiments thereof, it would be apparent to those skilled in the art that many modifications and variations may be made therein without departing from the spirit of the invention, the scope of which is defined by the attached claims.

For example, while the image-reading process described above are executed on the PC 1 in preferred embodiment, these processes may be executed on the multifunction device 10. In this case, the user operates the cursor keys 21b in the operating section 21 to set the scanning mode, edit the page number detection region, issue a command for a scan operation while the dialog window for setting the scanning mode and related messages are displayed on the display section 22. Further, programs of image-reading process are included in the image processing program 13e and executed by the CPU 11. Also, the list of page number detection regions 3L, the storage area for character recognition data 3D, the storage area for scanned data 3R, and the page number table 3T are allocated in areas of the memory unit 16. An area of the work area 12a is allocated for the scanner driver work area 2P. Further, the process for detecting page numbers is performed in the image processor 26.

The scanning process described in the fourth embodiment may be executed in the second or third embodiment instead of S44 or S84.

In editing the page number detection region, when two targets of character recognition are positioned adjacent to each other, the CPU 2a may edit the size of the page number detection region so that both targets are included in a single region, thereby increasing the processing speed over character recognition in two different locations. It should be apparent that this technique also does not require user operations.

What is claimed is:

1. An image-reading device comprising:
   a reading unit configured to read an original document as image data;
   a displaying unit configured to display the image data read by the reading unit;
   a memory storing a page number table;
   a processor configured to:
   set a recognition target region as part of the displayed image data;
   analyze the image data and recognize a page number in the analyzed image data of the recognition target region;
   determine a number of pages actually read by the reading unit;
   register the recognized page number and the number of pages in the page number table;
   determine a particular value by implementing a calculation in accordance with a formula (maximum page number– minimum page number+1), the maximum page number being the greatest page number among the recognized page numbers registered in the page number table, and the minimum page number being the least page number among the recognized page numbers registered in the page number table;
   determine that a page reading error has occurred when the particular value is different from the number of pages registered in the page number table;
   determine that the page reading error has occurred when the recognized page number is already stored in the page number table;
   when no page number is recognized in the image data, set a provisional page number corresponding to the image data in which no page number is recognized, and register the provisional page number in the page number table; and
   when a new page number is recognized in new image data that is obtained by reading a new original document and when the new page number is equivalent to the provisional page number, change the provisional page number in the page number table to a number different from both the page number and the new page number in the page number table.

2. The image-reading device as claimed in claim 1, where the processor is further configured to handle a reading error by performing a prescribed action when the processor determines that the page reading error has occurred.

3. The image-reading device as claimed in claim 2, further comprising a storing unit configured to store the image data read by the reading unit;
   wherein when the processor determines that the page reading error has occurred, the storing unit fails to store the image data.

4. The image-reading device as claimed in claim 2, further comprising an image storing unit configured to store the image data;
   wherein when the processor determines that the page reading error has occurred, the processor is configured to handle the reading error by overwriting image data of the relevant page number already stored in the image storing unit.

5. The image-reading device as claimed in claim 2, further comprising an image storing unit configured to store the image data;
   wherein when the processor determines that the page reading error has occurred, the processor is configured to handle the reading error by adding data to the page number table indicating that there are a plurality of entries of image data with the relevant page number and saves the plurality of entries of image data in the image storing unit.

6. The image-reading device as claimed in claim 2, further comprising an image storing unit configured to store the image data;
   wherein when the processor determines that the page reading error has occurred, the processor is configured to handle the reading error by adding information to a name of the relevant image data indicating that there are a plurality of entries of image data with the relevant page number and saving the relevant image data in the image storing unit.

7. The image-reading device as claimed in claim 1, wherein the page number table includes information indicating whether or not the page number is recognized from the image data;
   the processor is further configured to:
   sort the image data according to the information indicating whether or not the page number is recognized, and the page number; and
   store the image data based on the results of sorting by the sorting unit.

8. The image-reading device as claimed in claim 1, wherein the page number table includes information indicating the number of entries of image data with the relevant page number; and
   the processor determines that the page reading error has occurred based on the total number of image data entries and the page number included in the page number table.

9. An image-reading method comprising:
   reading an original document as image data;
   displaying the image data read by the reading step;
   wherein a processor performs the following steps:
   setting a recognition target region as a part of the displayed image data;
   analyzing the image data and recognizing a page number in the analyzed image data of the recognition target region;
   determining a number of pages actually read by the reading unit;
   registering, the recognized page number and the number of pages in a page number table;
   determining a particular value by implementing a calculation in accordance with a formula (maximum page number–minimum page number +1), the maximum page number being the greatest page number among the recognized page numbers registered in the page number table, the minimum page number being the least page number among the recognized page numbers registered in the page number table;
   determining that a page reading error has occurred when the particular value is different from the number of pages registered in the page number table;
   when no page number is recognized in image data, setting a provisional page number corresponding to the image data in which no page number is recognized, and registering the provisional page number in the page number table; and when a new page number is recognized in new image data that is obtained by reading a new original document and when the new page number is equivalent to the provisional page number, changing the provisional page number in the page number table to a number different from both the page number and the new page number in the page number table.

10. The image-reading method as claimed in claim 9, further comprising handling a reading error by performing prescribed action when it is determined that the page reading error has occurred in the reading error determining step.

11. The image-reading method as claimed in claim 10, further comprising storing the image data read in the reading step, and
skipping the image data storing step when it is determined that the page reading error has occurred in the reading error determining step.

12. The image-reading method as claimed in claim 10, further comprising storing the image data;
wherein the handling step includes overwriting image data of the relevant page number stored in the image data storing step when it is determined that the page reading error has occurred in the reading error determining step.

13. The image-reading method as claimed in claim 10, further comprising storing the image data;
wherein the reading error handling step includes adding data to the page number table indicating that there are a plurality of entries of image data with the relevant page number and storing the plurality of entries of image data.

14. The image-reading method as claimed in claim 10, further comprising storing the image data;
wherein the reading error handling step includes adding information to a name of the relevant image data indicating that there are a plurality of entries of image data with the relevant page number and storing the relevant image, when it is determined that the page reading error has occurred in the reading error determining step.

15. The image-reading method as claimed in claim 10, wherein the page number storing step includes storing, in the page number table, information indicating whether or not the page number is recognized from the image data;
the image-reading method further comprising:
sorting the image data according to the information indicating whether the page number is recognized, and the page number; and
storing the image data based on the results of sorting in the sorting step.

16. The image-reading method as claimed in claim 10, wherein the page number storing step includes storing, in the page number table, information indicating the number of entries of image data with the relevant page number; and
the reading error determining step determines that the page reading error has occurred based on the total number of image data entries and the page number included in the page number table.

17. A computer program recorded on a non-transitory computer readable recording medium, executable by a computer, said computer program comprising:
instructions for reading an original document as image data;
instructions for displaying the image data read by the reading step;
instructions for setting a recognition target region as part of the displayed image data;
instructions for analyzing the image data and recognizing a page number in the analyzed image data of the recognition target region;
instructions for determining a number of pages actually read by the reading unit;
instructions for registering the recognized page number, and the number of pages in a page number table;
instructions for determining a particular value by implementing calculation in accordance with a formula (maximum page number−minimum page number +1), the maximum page number being the greatest page number among the recognized page numbers registered in the page number table, the minimum page number being the least page number among the recognized page numbers registered in the page number table;
instructions for determining that a page reading error has occurred when the particular value is different from the number of pages registered in the page number table;
instructions for determining that the page reading error has occurred when the recognized page number is already stored in the page number table;
instructions for setting, when no page number is recognized in image data, a provisional page number corresponding to the image data in which no page number is recognized, and registering the provisional page number in the page number table; and
instructions for changing, when a new page number is recognized in new image data that is obtained by reading a new original document and when the new page number is equivalent to the provisional page number, the provisional page number in the page number table to a number different from both the page number and the new page number in the page number table.

* * * * *